United States Patent

Taguchi et al.

[11] Patent Number: 6,132,635
[45] Date of Patent: Oct. 17, 2000

[54] PROCESS FOR THE PRODUCTION OF ANISOTROPIC FERRITE MAGNETS AND ANISOTROPIC FERRITE MAGNETS AS WELL AS HEXAGONAL SYSTEM FERRITE PARTICLES AND THEIR PRODUCTION PROCESS

[75] Inventors: Hitoshi Taguchi; Fumihiko Hirata; Taku Takeishi; Teruo Mori, all of Chiba, Japan

[73] Assignee: TDK Corporation, Tokyo, Japan

[21] Appl. No.: 09/272,780

[22] Filed: Mar. 19, 1999

Related U.S. Application Data

[62] Division of application No. 08/812,702, Mar. 6, 1997, Pat. No. 5,945,028, which is a division of application No. 08/072,967, Jun. 8, 1993, Pat. No. 5,648,039, which is a continuation-in-part of application No. 07/913,706, Jul. 16, 1992, abandoned.

[30] Foreign Application Priority Data

| Apr. 24, 1992 | [JP] | Japan | 4-131649 |
| May 29, 1992 | [JP] | Japan | 4-164379 |
| Jun. 5, 1992 | [JP] | Japan | 4-172069 |
| Mar. 15, 1993 | [JP] | Japan | 5-80042 |

[51] Int. Cl.$^7$ .................................................. C04B 35/26
[52] U.S. Cl. ............................. 252/62.56; 252/62.59; 252/62.63
[58] Field of Search ...................... 252/62.56, 62.59, 252/62.63

[56] References Cited

U.S. PATENT DOCUMENTS

| Re. 26,153 | 1/1967 | Cochardt | 252/62.5 |
| 2,828,264 | 3/1958 | Medvedieff | 264/24 |
| 2,886,530 | 5/1959 | Gregor | 264/56 |
| 3,755,515 | 8/1973 | Cochardt et al. | 264/24 |
| 3,794,720 | 2/1974 | Nye | 423/574 |
| 3,855,374 | 12/1974 | Brailowsky et al. | 264/24 |
| 4,120,807 | 10/1978 | Watanabe et al. | 264/24 |
| 4,397,796 | 8/1983 | Lotgering et al. | 264/24 |
| 4,411,807 | 10/1983 | Watanabe et al. | 252/62.63 |
| 4,457,851 | 7/1984 | Tabaru et al. | 252/62.63 |
| 5,061,412 | 10/1991 | Okumori et al. | 264/24 |
| 5,098,619 | 3/1992 | Facaros | 264/24 |
| 5,607,615 | 3/1997 | Taguchi et al. | 252/62.69 |
| 5,648,039 | 7/1997 | Taguchi et al. | 264/428 |
| 5,811,024 | 9/1998 | Taguchi et al. | 252/62.63 |
| 5,846,449 | 12/1998 | Taguchi et al. | 252/62.62 |
| 5,945,028 | 8/1999 | Taguchi et al. | 252/62.56 |

FOREIGN PATENT DOCUMENTS

| 36 17 687 | 12/1987 | Germany. |
| 61-222206 | 3/1985 | Japan. |
| 61-261261 | 11/1986 | Japan. |
| 61-261262 | 11/1986 | Japan. |

OTHER PUBLICATIONS

H. Taguchi, et al, "High Performance Ferrite Magnet", Proceedings of the Sixth International Conf. On Ferrites, Japan Society of Powder and Powder Metallurgy (1992) no month.

H. Taguchi, et al, "High Performance Anisotropic Ferrite Magnets" Reported at the 12$^{th}$ Takei Seminar Conference on Jul. 18, 1992.

(List continued on next page.)

*Primary Examiner*—C. Melissa Koslow
*Attorney, Agent, or Firm*—Oblon, Spivak, McClelland, Maier & Neustadt, P.C.

[57] ABSTRACT ferrite magnet raw material particles and a non-aqueous solvent is compacted wet in a magnetic field, while said non-aqueous solvent is removed therefrom, to obtain a compact, and the compact is sintered to obtain an anisotropic ferrite magnet. In this case, a surface active agent is allowed to exist in the slurry during the wet compaction. Alternatively, in addition to or in place of this, the raw material particles are pulverized to apply strains thereto, thereby reducing the iHc values to preferably 3.5 kOe or less. This makes some considerable improvement in the degree of orientation of the compact, thus achieving much more improved magnet properties.

13 Claims, 11 Drawing Sheets

OTHER PUBLICATIONS

H. Taguchi, et al, "Crystal Distortion of Sr–ferrite Particles by Miling" reported at the society meeting held by the Japan Socity of Powder and Powder Metallurgy, Jun. 10, 1992.

Patent Abstracts of Jpaan, vol. 10, No. 87 (E–393), May 4, 1986, JP–A–60 233 803.

Patent Abstracts of Japan, vol. 4, No. 141 (E–028), Oct. 4, 1980, JP–A–55 091 803, Jul. 11, 1980.

Data Base WPI, Derwent Publications, AM 86–301165, JP–A–61 222 206, Oct. 2, 1986 & Patent Abstracts of Japan, vol. 11, No. 61 (E–483), Feb. 25, 1987, JP–A–61 222 206, Oct. 2, 1986.

PREDICTED MAGNETIZATION
CURVES OF ONE PARTICLE

PROCESS FOR THE PRODUCTION OF ANISOTROPIC FERRITE MAGNETS AND ANISOTROPIC FERRITE MAGNETS AS WELL AS HEXAGONAL SYSTEM FERRITE PARTICLES AND THEIR PRODUCTION PROCESS

This application is a Division of application Ser. No. 08/812,702, now U.S. Pat. No. 5,945,028, filed on Mar. 6, 1997, which is a Division of application Ser. No. 08/072,967 filed on Jun. 8, 1993, now U.S. Pat. No. 5,648,039, which is a CIP of application Ser. No. 07/913,706 filed on Jul. 16, 1992, now abandoned.

BACKGROUND OF THE INVENTION

1. Technical Field

The present invention relates to hexagonal ferrite particles and their production process as well as an anisotropic ferrite magnet and its production process.

2. Background Technique

Currently available oxide permanent magnet materials, for the most part, are Sr ferrites based on an M type hexagonal or other systems or, possibly, Ba ferrites, and their sintered or bonded magnets are produced. In order to increase the residual magnetic flux density, Br, of the properties of a magnet, it is important to increase its density and make it anisotropic by magnetic field pressing. In order to enhance another magnet property, say, coercive force, Hc, it is important to reduce ferrite particles to 1 $\mu$m or less in size, thereby forming single domain particles.

So far, sintered magnets of Ba or Sr ferrites have been produced in the following manners. That is to say, iron oxide is mixed with the carbonate of Ba or Sr, and the mixture is then calcined for the completion of its ferritic reaction. After that, the calcined product is pulverized, pressed or otherwise compacted in a magnetic field, and sintered. In order to increase the Hc of a magnet, it is required to provide for ferrite particles of 1 $\mu$m or less for pressing or compacting them in a magnetic field in consideration of grain growth at the time of sintering. To this end, two ways are available, one in which particles of a few $\mu$m or more are reduced to 1 $\mu$m or less after calcination and the other in which ferrite particles are synthesized in such a way that they have already been reduced to 1 $\mu$m or less before pulverization.

Pulverization or the compaction of powders in a magnetic field may be achieved in two ways, say, a dry way and a wet way using a solvent. The wet procedure makes it easier to reduce ferrite particles to 1 $\mu$m or less when compared with the dry procedure, and is favorable for enhancing the performance of a magnet as well, because of its excellent degree of orientation during the compaction in a magnetic field. For such wet pulverization, water has conventionally been used as the solvent.

On the other hand, increasing the proportion of single-domain particles may be achieved by co-precipitation, hydrothermal synthesis, or conventional ways in which fine materials are mixed together with high accuracy and the mixture is then calcined at a relatively low temperature at which no particle growth occurs. These procedures make it possible to obtain fine ferrite particles lying in the range of 0.01 to 1 $\mu$m, thus allowing these particles to have a very high iHc (a high of about 6 kOe).

It is considered necessary to use such fine particles so as to increase the performance of an oxide permanent magnet, but never until now is there any report about anisotropic magnets using them and oriented in a magnetic field. Nor are they practically used.

This reason is that when an anisotropic magnet is produced with such fine particles, its iHc is increased, but its Br degrades so that no effect is obtained on improving its magnetic characteristics. And the reason for this Br degradation believes chiefly in the deterioration of the degree of orientation during the compaction in a magnetic field.

One reason for the degradation of the degree of orientation is that as the sizes of ferrite particles become smaller than required, for instance, are of the order of 0.1 $\mu$m or less and the magnitude of magnetization ($\sigma$s) is reduced as well, the rotational torques of the particles in a magnetic field are diminished. Another leading reason is that as the coercive forces (bHc) of the particles are increased as will be described later, they are likely to agglomerate together magnetically.

So far, the iHc of an M type Ba ferrite powder of 0.1 to 0.3 $\mu$m, for instance, has reached a high of 4650 Oe, as set forth in the examples disclosed in JP-B 62-53443, but the as is as low as 44 emu/g. Indeed, those examples are silent about any anisotropic magnet made up of such powder. Likewise, JP-B 49-38917 refers to powders of 1 $\mu$m or less having an iHc value as high as 4250 Oe, but makes a mention of rubber magnet production alone.

DISCLOSURE OF THE INVENTION

A primary object of this invention is to eliminate the problems associated with the conventional magnets mentioned above by the provision of an anisotropic ferrite magnet much more improved in terms of performance than ever before and its production process as well as hexagonal ferrite particles that are the raw materials therefor and their production process.

According to the present invention, this and other objects are achieved by:

1. A process for producing an anisotropic ferrite magnet by compacting a slurry containing the particulate raw materials for said ferrite magnet and a non-aqueous solvent in a magnetic field while removing said non-aqueous solvent therefrom to obtain a compact, and sintering said compact, wherein:

a surface active agent is allowed to exist in said slurry, thereby improving the degree of orientation of said compact.

2. A process for producing an anisotropic ferrite magnet as recited in the above 1, wherein the step of preparing said slurry involves the wet pulverization of a slurry containing the starting powders of said particulate raw materials and said non-aqueous solvent.

3. A process for producing an anisotropic ferrite magnet as recited in the above 1, wherein the step of preparing said slurry involves the wet pulverization of the starting powders of said particulate raw materials, followed by the substitution of the solvent used there by said non-aqueous solvent.

4. A process for producing an anisotropic ferrite magnet as recited in the above 1, wherein the step of preparing said slurry involves the dry or wet pulverization of the starting powders of said particulate raw materials, followed by the addition of said surface active agent, or said active agent and said non-aqueous solvent.

5. A process for producing an anisotropic ferrite magnet as recited in the above 1, wherein said surface active agent is added to the starting powders of said particulate raw materials prior to dry or wet pulverization.

6. A process for producing an anisotropic ferrite magnet as recited in the above 1, wherein said particulate raw materials or the starting powders thereof are prepared by calcination, and dry pulverization.

7. A process for producing an anisotropic ferrite magnet as recited in the above 1, wherein said particulate raw materials in said slurry have a mean particle diameter of 1 μm or less.

8. A process for producing an anisotropic ferrite magnet as recited in the above 7, wherein the coefficient of variation of the particle diameter of said particulate raw materials is 80% or less.

9. A process for producing an anisotropic ferrite magnet as recited in the above 1, wherein crystal strains are introduced in said particulate raw materials, with the iHc value reduced to 3.5 kOe or less.

10. A process for producing an anisotropic ferrite magnet as recited in the above 1, wherein crystal strains are introduced into said particulate raw materials, and anisotropy constants $K_1$ and $K_2$ in an external magnetic field of 20 kOe, determined by the torque curves thereof, conform to $$K_2/(K_1+K_2) \geq 0.2$$

11. A process for producing an anisotropic ferrite magnet as recited in the above 1, which has a degree of orientation of 96% or more, as expressed in terms of the ratio of saturation magnetization to residual magnetization.

12. A process for producing an anisotropic ferrite magnet as recited in the above 1, wherein the degree of orientation of said compact is 78% or more.

13. A process for producing an anisotropic ferrite magnet as recited in the above 1, wherein said surface active agent contains a metal element added to ferrite.

14. A process for producing an anisotropic ferrite magnet as recited in the above 1, wherein said surface active agent is allowed to exist in an amount of 0.1 to 5% by weight with respect to said particulate raw materials.

15. A process for producing an anisotropic ferrite magnet as recited in the above 1, wherein said surface active agent is adsorbed onto the surfaces of said particulate raw materials in said slurry.

16. A process for producing an anisotropic ferrite magnet as recited in the above 1, wherein said non-aqueous solvent has a viscosity of 0.3 to 3 cps at 20° C.

17. A process for producing an anisotropic ferrite magnet as recited in the above 1, wherein said non-aqueous solvent has a vapor pressure of 1 to 200 mmfg at 20° C.

18. A process for producing an anisotropic ferrite magnet as recited in the above 1, wherein said non-aqueous solvent has a boiling point of 50 to 300° C.

19. A process for producing an anisotropic ferrite magnet as recited in claim 1, wherein the content of said particulate raw materials in said slurry is 70 to 95% by weight.

20. A process for producing an anisotropic ferrite magnet as recited in the above 1, wherein said particulate raw materials are obtained by mixing together the starting materials for obtaining said particulate raw materials or the starting powders therefor, calcining the mixture and pulverizing the thus calcined powders, and in the mixing of said starting materials, $SiO_2$ is added to said starting materials in an amount of 10 to 90% by weight of the total amount to be added, and in said pulverization of said calcined powders, the rest of $SiO_2$ is added to said calcined powders, thereby obtaining an anisotropic ferrite containing 0.2 to 1.5% by weight of $SiO_2$.

21. A process for producing an anisotropic ferrite magnet as recited in the above 20, wherein, in said wet pulverization, said rest of $SiO_2$ and said surface active agent are added to said calcined powders, thereby allowing said calcined powders to contain 0.05 to 0.4% by weight of $SiO_2$.

22. A process for producing an anisotropic ferrite magnet as recited in the above 20, wherein, in the mixing of said starting materials, at least one component selected from the group consisting of Ca, Sr and Ba components is added to said starting materials, and the contents of said at least one component selected from Ca, Sr and Ba components and $SiO_2$ in said calcined powders are determined such that the molar (the total amount of Ca, Sr and Ba)/Si ratio is limited to the range of 0.4 to 1.4.

23. A process for producing an anisotropic ferrite magnet by pulverizing hexagonal ferrite raw material particles to apply mechanical stress to the hexagonal system ferrite particles, thereby introducing crystal strains therein and so reducing the iHc values thereof, compacting said particles in a magnetic field, and sintering the resultant compact.

24. A process for producing an anisotropic ferrite magnet as recited in the above 23, wherein anisotropy constants $K_1$ and $K_2$ at a magnetic field of 20 kOe, determined by measuring the torque curves of said hexagonal system ferrite particles, conform to $$K_2/(K_1+K_2) \geq 0.2$$

25. A process for producing an anisotropic ferrite magnet as recited in the above 23, wherein strains of the (206) planes of said hexagonal system ferrite particles, measured by X-rays, are $1 \times 10^{-4}$ or more.

26. A process for producing an anisotropic ferrite magnet as recited in the above 23, wherein said hexagonal ferrite particles have a mean particle diameter of 1 μm or lower, with the coefficient of variation of the particle diameter being 80% or lower.

27. A process for producing an anisotropic ferrite magnet as recited in the above 23, which has a mean crystal grain diameter of 1.0 μm or lower, with the coefficient of variation thereof being 80% or lower.

28. A process for producing an anisotropic ferrite magnet as recited in the above 23, which has a degree of orientation of 93% or more, as expressed in terms of the ratio of saturated magnetization and residual magnetization.

29. A process for producing an anisotropic ferrite magnet as recited in the above 23, wherein said compact has a degree of orientation of 70% or more.

30. A process for producing an anisotropic ferrite magnet as recited in the above 23, wherein said pulverization involves wet pulverization.

31. A process for producing an anisotropic ferrite magnet as recited in the above 23, wherein said wet pulverization makes use of an aqueous solvent, and said hexagonal system ferrite particles are pulverized wet with the addition of a high molecular dispersant, followed by wet compaction in a magnetic field.

32. A process for producing an anisotropic ferrite magnet as recited in the above 31, wherein said high molecular dispersant is of an ammonium polycarboxylate salt type.

33. A process for producing an anisotropic ferrite magnet as recited in the above 23, wherein said particulate raw materials are obtained by mixing together the starting materials for obtaining said particulate raw materials or the starting powders therefor, calcining the mixture and pulverizing the thus calcined powders, and in the mixing of said starting materials, $SiO_2$ is added to said starting materials in an amount of 10 to 90% by weight of the total amount to be added, and in said pulverization of said calcined powders, the rest of $SiO_2$ is added to said calcined powders, thereby obtaining an anisotropic ferrite containing 0.2 to 1.5% by weight of $SiO_2$.

34. A process for producing an anisotropic ferrite magnet as recited in the above 33, wherein, in said wet pulverization, said rest of $SiO_2$ and said surface active agent are added to said calcined powders, thereby allowing said calcined powders to contain 0.05 to 0.4% by weight of $SiO_2$.

35. A process for producing an anisotropic ferrite magnet as recited in the above 33, wherein, in the mixing of said starting materials, at least one component selected from the group consisting of Ca, Sr and Ba components is further added to said starting materials, and the contents of said at least one component selected from Ca, Sr and Ba components and $SiO_2$ in said calcined powders are determined such that the molar (the total amount of Ca, Sr and Ba)/Si ratio is limited to the range of 0.4 to 1.4.

36. An anisotropic ferrite magnet which has a mean crystal grain diameter of 1.0 $\mu$m with the coefficient of variation being 80% or lower, and a degree of orientation of 96% or more, as expressed in terms of the ratio of saturated magnetization and residual magnetization.

37. A hexagonal ferrite particle, in which the anisotropy constants $K_1$ and $K_2$ at an external magnetic field of 20 kOe, determined by measuring the torque curve thereof, conform to $$K_2/(K_1+K_2) \geq 0.2$$

38. A hexagonal ferrite particle of uniaxial magnetocrystalline anisotropy, in which strain of the (206) plane, measured by X-ray diffraction, is $1 \times 10^{-4}$ or more.

39. A hexagonal ferrite particle as recited in the above 37 or 38, which has crystal strain introduced therein by pulverizing the raw material powder.

40. A hexagonal ferrite particle as recited in the above 39, which has an iHc value reduced by crystal strain.

41. A hexagonal ferrite particle as recited in the above 40, which has an iHc value of 3.5 kOe or lower.

42. A hexagonal ferrite particle as recited in the above 41, in which the amount of a change of iHc with respect to temperature is reduced by crystal strain.

43. A hexagonal ferrite particle as recited in the above 41, which has a mean particle diameter of 1 $\mu$m or lower with the coefficient of variation being 80% or less.

44. A process for producing a hexagonal ferrite particle by applying mechanical stress to a hexagonal ferrite raw material powder, thereby allowing the anisotropy constants $K_1$ and $K_2$ at an external magnetic field of 20 kOe, determined by measuring the torque thereof to conform to $$K_2/(K_1+K_2) \geq 0.2$$

45. A process for producing a hexagonal ferrite particle by applying mechanical stress to a hexagonal ferrite raw material powder, thereby introducing in the (206) plane a strain that is $1 \times 10^{-4}$ or more, as measured by X-ray diffraction.

46. A process for producing a hexagonal ferrite particle as recited in the above 44 or 45, wherein said mechanical stress is applied to said hexagonal ferrite raw material powder by wet and/or dry pulverization.

The present inventor has found out that a surface active agent capable of being adsorbed onto the surfaces of ferrite particles is added to the raw materials for ferrite magnets, the ferrite particles are dispersed in a non-aqueous solvent to form a slurry and the slurry is pressed or otherwise compacted wet in a magnetic field, whereby, even when use is made of fine particles of 1 $\mu$m or less, the degree of orientation of the obtained compact is increasingly improved with some considerable improvements in the magnetic properties of the compact after sintering.

When use is made of previously synthesized powders containing particles of 1 $\mu$m or less in a large proportion, it is preferred that the iHc of the powders is simultaneously reduced by the introduction of strains by pulverization. Alternatively, when ferrite particles of a few $\mu$m or more are used, it is preferred that when a surface active agent capable of being adsorbed onto the surfaces thereof and the ferrite particles are dispersed in a non-aqueous solvent, they are simultaneously reduced to 1 $\mu$m or less by pulverization. When the ferrite particles having an iHc value of 3.5 kOe, especially, the M type Sr ferrite particles having an iHc value of 3 kOe or less and with crystal strains introduced in them are dispersed in a non-aqueous solvent for the wet compaction in a magnetic field, while the surface active agent is adsorbed thereonto, the degree of orientation expressed in terms of the ratio between residual magnetization and saturation magnetization is increasingly improved to 78% or more, especially, 80% or more in the case of the compact and to 96% or more, especially, 97% or more in the case of the sintered body. In other words, a selective effect on improving the degree of orientation based on the combined use of the non-aqueous solvent and the surface active agent for compacting in a magnetic field is synergistically added to the effect on improving the degree of orientation due to the restriction placed by the crystal strains and coercive forces in the compacted powders. In this case, the added surface active agent is unlikely to remain as a non-magnetic portion, because it is easily decomposed and scattered about during sintering. This makes it possible to obtain higher magnet properties than ever before, say, Br of about 4.4 kG and iHc of 4.0 to 4.2 kOe.

So far, treating fine magnetic particles in a non-aqueous solvent has been known to be effective as means for dispersing them with high efficiency. For instance, magnetic fluids are produced by adding and adsorbing oleic acid to fine particles of magnetite or the like and then dispersing them in a non-aqueous solvent such as kerosene. Similar procedures are applied to fine particles of $Fe_2O_3$ or the like as well for magnetic tape production.

As to the purpose of the high orientation of magnet materials during the wet pressing or compaction in a magnetic field, however, never until now is there any report about their investigation. In other words, the present inventors have found for the first time that such procedures are effective for the orientation of magnet materials, especially, fine magnetic particles of 1 $\mu$m or less, in a magnetic field. According to the present invention, it is possible to obtain sintered ferrite magnets having higher magnetic properties than ever before by the high orientation of ferrite particles of 1 $\mu$m or less.

It is noted that the following prior publications refer to the wet pulverization in a non-aqueous, especially, an organic solvent and the wet compaction in a magnetic field for the production of magnet materials, but they all differ essentially from the present invention.

(1) JP-A 61-114505 publication

This refers to permanent magnets based on rare earth-iron-boron, and discloses wet pulverization using a non-aqueous solvent with a view to preventing the oxidation of the starting powders.

(2) JP-A 61-291901 publication

This refers to the wet pulverization of rare earth-containing the starting permanent magnet material powders using a non-aqueous solvent for the purpose of reducing the amount of oxygen in the sintered body.

(3) J-P-A 61-236109 publication

This concerns the wet formation of rare earth magnets as well as ferrite magnets using a non-aqueous solvent for the purpose of preventing oxidation and reducing the amount of residual carbon. To this end, a solvent having a low solubility in water is selectively used. As a matter of course, no surface active agent is added at all. From such a point-of-view, this itself has no appreciable relation to ferrite magnets; the examples present Nd magnets alone.

(4) JP-A 64-42105 publication

This concerns a ferrite magnet and claims that the raw material is wet-pulverized in water or an organic solvent and then added with stearic acid or its emulsion. The invention set forth therein has been achieved for improving compactibility (compacting yield) and is silent about improving magnet properties, especially, the degree of orientation; the examples refer only to the addition of stearic acid in water, followed by pulverization and compaction. In this connection, note that the effect of the present invention is unachievable when the wet compaction is carried out with water instead of the non-aqueous solvent, as will be appreciated from the examples to be given later.

It is further noted that even when fine ferrite particles of 1 μm or less are merely compacted in a magnetic field, the resulting compact is increasingly improved in terms of the degree of orientation and so can be sintered to obtain a magnet having greatly improved magnetic properties, although it is required that they have a proper particle diameter range of 0.1 to 1 μm, and a large magnetization (as) that is as close to the theoretical value (about 71.5 emu/g) as possible, and given crystal strains be introduced in them by the pulverization of the raw material for ferrite magnets.

As mentioned above, when use is made of previously synthesized powders particles of 1 μm or less in a large proportion, the iHc of the powders is simultaneously reduced by the introduction of strains in them by pulverization. Alternatively, ferrite particles of a few μm or more may simultaneously be reduced to 1 μm or less by pulverization. When the ferrite particles having an iHc value of 3.5 kOe, especially, the M type Sr ferrite particles having the iHc value of 3 kOe or less and crystal strains introduced in them are dispersed in, for instance, an aqueous slurry for the wet compaction in a magnetic field, the degree of orientation expressed in terms of the ratio between residual magnetization and saturation magnetization is increasingly improved; it reaches as high as 74% in the case of the compact and as high as 94% in the case of the sintered compact. In other words, an extremely remarkable effect on improving the degree of orientation is achieved by restrictions placed on the crystal strains and coercive forces of the compacted powders. This makes it possible to obtain higher magnet properties than ever before, say, a Br value of about 4.2 kG and an iHc value of about 4.2 kOe.

In the present invention, it is preferable to add $SiO_2$ in the following ways, and this holds for all the production procedures mentioned above. That is, it is preferable to use the above ferrite magnet raw material, or its particles or calcined powders. However, it is then desired that 10 to 90% by weight of the total amount of $SiO_2$ is added when the raw material for preparing the calcined powder is mixed together or prior to calcination, and the rest of $SiO_2$ is added at any one of the above pulverization steps. In this case, the content of $SiO_2$ in the calcined powder lies preferably at 0.05 to 0.4% by weight, while the content of $SiO_2$ in the ferrite magnet lies preferably at 0.2 to 1.5% by weight.

By making use of this method of adding $SiO_2$ and limiting the content of $SiO_2$ in the calcined powder, it is possible to inhibit the growth of ferrite particles and increase the iHc of the calcined powder to a large-enough level.

This addition method is much more improved over those of adding $SiO_2$ at the time of pulverization in terms of the dispersibility of $SiO_2$, so that the effect on improving sintered density can be easily achieved. In other words, the application of a low calcination temperature enables ferrite particles of sub-micron order to be obtained after calcination, but there is a low sintered density problem. However, this problem can be easily solved, resulting in the achievement of good-enough magnet properties.

ILLUSTRATIVE CONSTRUCTION OF THE INVENTION

Figure 1:
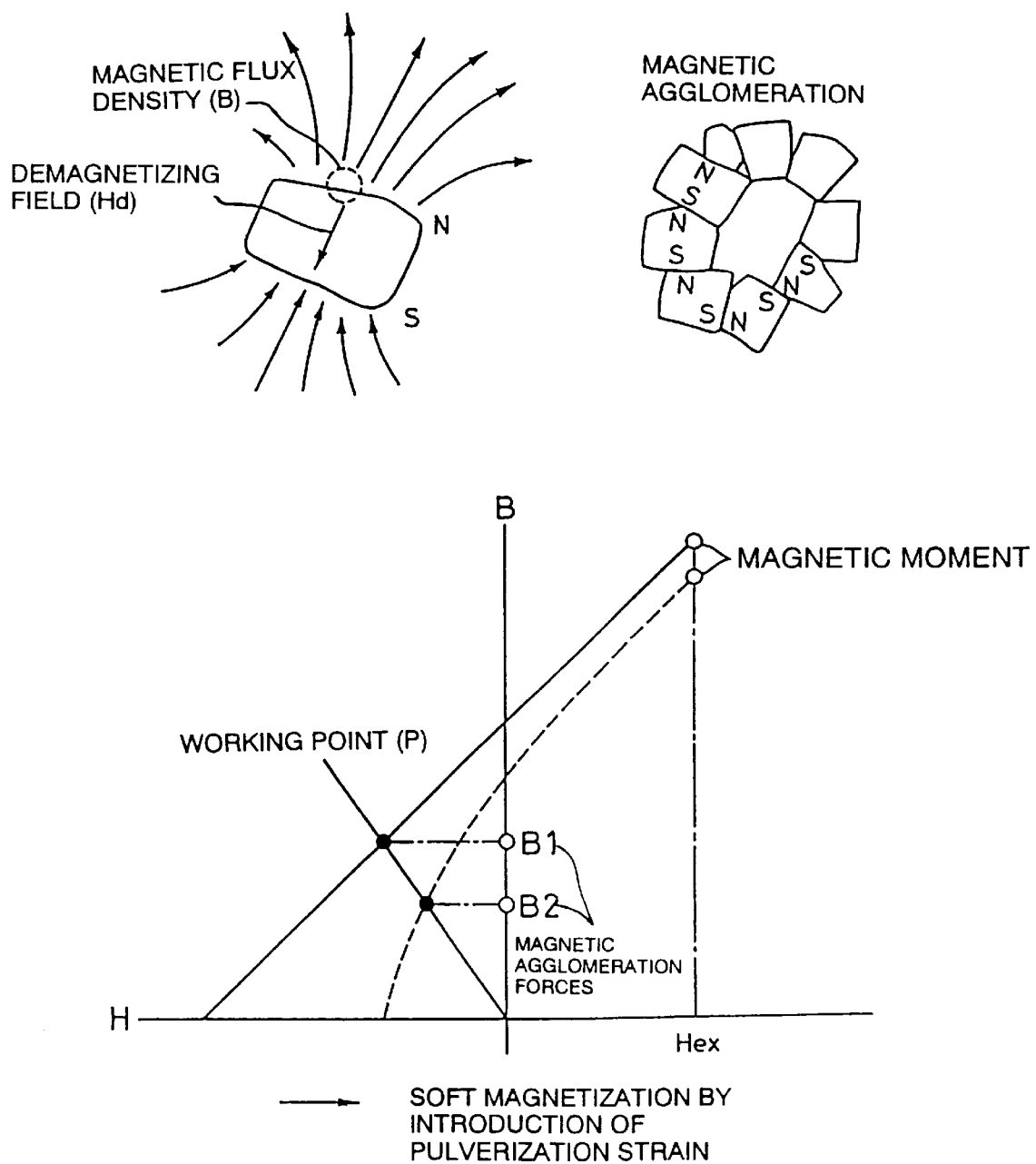
FIG. 1 illustrates one of the principles of improvements in the degree of orientation according to the present invention.

In what follows, the illustrative construction of the present invention will be explained at great length.

The anisotropic ferrite magnet according to the present invention is primarily composed of hexagonal ferrites such as a magnetoplumbite type of M and W phases. Of such ferrites, particular preference is given to $MO.nFe_2O_3$ (M is preferably at least one member from Sr and Ba and n=4.5 to 6.5). Such ferrites may additionally contain Ca, Pb, Al, Ga, Sn, Zn, In, Co, Ni, Ti, Cr, Mn, Cu, Ge, Nb, Zr, Cr, and so on.

In order to produce the anisotropic magnet made up of the sintered compact of such ferrites according to the present invention, the predetermined raw materials are first mixed together, followed by calcination. In order to obtain fine ferrite particles after calcination, for instance, it is desired that in mixing, an aqueous slurry of iron oxide is first pulverized wet and an aqueous solution of a water-soluble salt of said M is added to the powder in the presence of $Na_2CO_3$, or the like, whereby the carbonate of M is precipitated out for, mixing with the fine oxide iron particles with high accuracy. Alternatively, the fine carbonate of M may be sufficiently mixed with iron oxide. After that, washing, drying and calcination are carried out. Calcination may occur, for instance, at 1000 to 1350° C. for 1 second to 10 hours in the atmosphere. In order to obtain fine calcined powder of the M type Sr ferrite in particular, calcination may occur at 1000 to 1200° C. for about 1 second to 3 hours.

In order to obtain the above calcined powder, commercial products such as strontium carbonate ($SrCO_3$) or barium carbonate ($BaCO_3$) may be immediately used as the carbonate of M, i.e., an M source. It is then preferable that the particle diameter of the raw materials including iron oxide ($Fe_2O_3$) that provides an iron source (that of the primary particle) lies in the range of 0.03 to 2.5 $\mu$m, with a preferable mean particle diameter of about 0.1 to 1.5 $\mu$m.

The calcined powder may be obtained as mentioned above. In the present invention, however, the addition of $SiO_2$ should preferably be conducted in the mixing or blending of the predetermined raw materials. In order to achieve good-enough magnet properties, $SiO_2$ is used in such an amount that the ferrite sintered compact has an $SiO_2$ content of 0.2 to 1.5% by weight. That is, it is desired that 10 to 90% by weight, preferably 10 to 50% by weight of the total amount to be added—that satisfies this relation—be used in the mixing of the raw materials or prior to the calcination of the raw materials. As a result, calcined powder having an $SiO_2$ content of 0.05 to 0.4% by weight is obtained.

By adding $SiO_2$ to the raw materials in the manner mentioned above when they are mixed together, an improvement in sintered density is easily achieved because of the dispersibility of $SiO_2$ being improved, and this is true of even when calcination occurs at a relatively low temperature so as to obtain ferrite particles with the particle diameter being of the sub-micron order after calcination. If $SiO_2$ is added to the raw materials at a time when they are mixed together, on the contrary, the dispersibility of $SiO_2$ will then become insufficient under the same calcination conditions, rendering sintered density unlikely to increase. If the content of $SiO_2$ in the calcined power is less than 0.05% by weight, $SiO_2$ will then be unlikely to produce its own effect, and at higher than 0.4% by weight, $SiO_2$ will be then likely to undergo particle growth, making the iHc of the calcined powder likely to drop and so making it difficult to achieve good-enough magnet properties.

For $SiO_2$, use may be made of commercially available products with the mean particle diameter lying at about 0.02 to 0.1 $\mu$m. $SiO_2$, when contained as impurities in the raw materials, may be used as such.

In the present invention, it is preferable to use Ca components such as $CaCO_3$ simultaneously with the addition of $SiO_2$. In connection with the amount of $CaCO_3$ to be added, it is desired that the Ca/Si (molar) ratio lie in the range of 0.4 to 1.4, preferably 0.5 to 1.2, as determined by analyzing the calcined powder. This addition of $CaCO_3$ can ensure the prevention of the reaction between M and $SiO_2$ that is required for ferrite formation. If too little $CaCO_3$ is used, it will then fail to produce its own effect. On the other hand, if too much is used, the magnet properties will often become inferior. In most cases, $CaCO_3$ is contained as impurities in the raw materials, such as when commercially available material is used as the carbonate of M, and so there is in some cases no need of using fresh $CaCO_3$. Usually, however, commercially available material is used to this end. The mean particle diameter of $CaCO_3$ used may lie in the range of about 0.1 to 2 Hm.

In the present invention, the above $CaCO_3$ may be partly or wholly replaced by an Sr component such as $SrCO_3$, a Ba component such as $BaCO_3$, or the like. These may be partly used as an alternative to $CaCO_3$. In general, $SrCO_3$ and $BaCO_3$ are used as the raw materials for the M type of Sr and Ba ferrites, respectively. In other words, these raw materials may be used in excess so as to obtain such ferrites.

Preferably, such calcined powders have substantially a magnetoplumbite type ferrite structure, with the primary particles having a mean particle diameter of 0.1 to 1 $\mu$m, especially, 0.1 to 0.5 $\mu$m. The mean particle diameter may be measured scanning electron microscope (SEM) fractography, and these powders have preferably a coefficient of variation (CV) of 80% or less, especially 10 to 70% in general. It is also preferred that the saturation magnetization as lies at 65 to 80 emu/g, in particular, that of the M type ferrite powders lies at 65 to 71.5 emu/g and the coercive force iHc lies at 2000 to 8000 Oe, in particular, that of the M type ferrite powders lies at 4000 to 8000 Oe. Note that the particle diameters of the calcined powders are not limited to those mentioned above, as will be described later.

Then, the calcined powders are pulverized. Preferably, the bHc of the particles is reduced by introducing crystal strains in them by pulverization. So far, the magnet properties, especially, the degree of orientation, of ferrite magnets using fine ferrite particles of 0.01 to 0.1 $\mu$m obtained as by co-precipitation have been low, partly because the ferrite particles are much smaller in size than required and partly because the magnetization Os is low. Therefore, the first requirement is considered to be that the mean particle diameter is regulated to the range of, for instance, 0.1 to 0.5 $\mu$m during the compaction, as mentioned above, and that the saturation magnetization as is made close to the theoretical value (about 71.5 emu/g in the case of the M type Sr ferrite). However, even 0.1 to 1 $\mu$m ferrite particles having a large as are likely to agglomerate together, because they are converted to single-domain particles so that the iHc and bHc are increased to produce magnetic forces among them. As a result, making them anisotropic by a magnetic field is avoided. It is now found that the attraction or agglomeration forces among the ferrite particles are proportional to the square of the magnetic flux densities of their surfaces. These surface magnetic flux densities ($B_0$) are magnetic flux densities B1 and B2 on the so-called working points defined by the shapes of the particles and the geometry of the second quadrant of a BH curve, as illustrated in FIG. 1. In other words, the larger the bHc of ferrite particles the higher the surface magnetic flux densities ($B_0$) and so the larger the agglomeration forces ($B_0^2$). Therefore, in order to decrease the agglomeration forces among ferrite particles, it is favorable to decrease the bHc and reduce the squareness of the second quadrant.

On the other hand, it would be easily expected that the larger the magnetic moment in a certain external magnetic field, the more favorable it is to achieve the high orientation of ferrite particles during the compaction in the magnetic field. Accordingly, in order to decrease the magnetic agglomeration forces among them and achieve the high orientation of them, the ferrite particles having uniaxial magnetoanisotropy may be soft-magnetized temporarily and apparently. Then, these soft-magnetized particles may be converted to a permanent magnet by returning to their own hard magnetism at the later step. Besides, these ferrite particles may be used as such in the form of magnetic powders for magnetic recording media.

Figure 3:
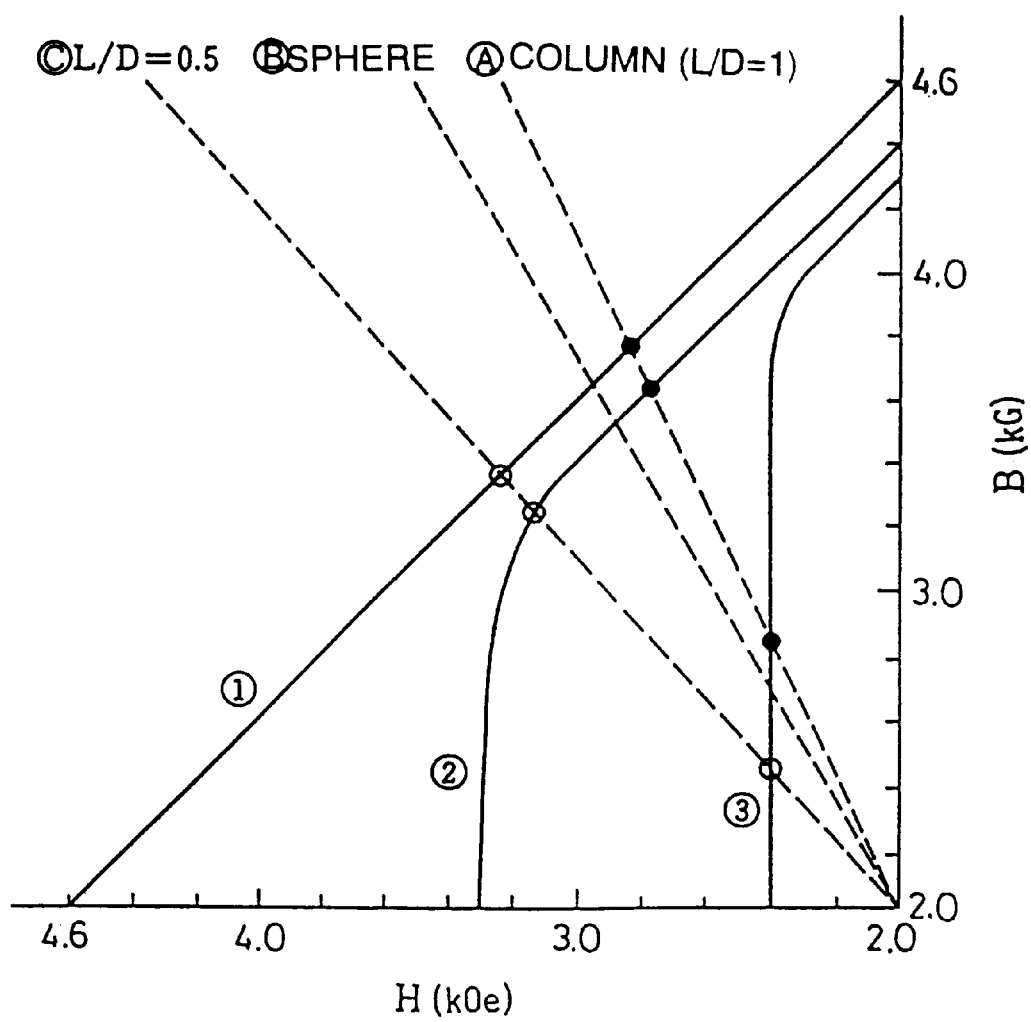
FIG. 3 is a graph showing expected B-H curves of one ferrite particle.

The B-H curve of one particle depicted in FIG. 1 can be obtained only by prediction. This is because that of one particle of 1 μm or less cannot practically be measured for the reason that some problems arise in connection with its separation and the sensitivity to its measurement. For that reason, the BH curve of one Sr ferrite particle was anticipated for each magnitude of iHc in the light of the experimental data gleaned by the pulverization of the M type Sr ferrite (FIG. 3). Then, the magnetic agglomeration force ($Bo^2$) was anticipated from the BH curve of this one ferrite particle, as set out in Table 1. This was calculated by the following procedure.

TABLE 1

Anticipation of the magnetic agglomeration force of one particles

| Magnetization Curves | A Ratio of Agglomeration Forces | | B Ratio of Agglomeration Forces | |
|---|---|---|---|---|
| | Bo(G) | ($B0^2$) | Bo(G) | ($Bo^2$) |
| 1 | 3760 | 1.00 | 3360 | 1.00 |
| 2 | 3630 | 0.93 | 3240 | 0.93 |
| 3 | 2840 | 0.57 | 2440 | 0.53 |

Some literature (for instance, *J.Appl.Phys.*, Vol. 53, No. 11, page 7867 (1982)) refers to the measurement of Ba ferrite particles of about 4 μm, reporting that the I-H curves thereof have much improved squareness. This appears to hold for particles of 1 μm as well. Various BH curves, anticipated in consideration of these, are illustrated in FIG. 3. If iHc is larger than Br, then it is expected that bHc is nearly equal to Br. On the other hand, if iHc is smaller than Br, then bHc is nearly equal to iHc. Now assume that the particle takes a columnar form. Then, when the ratios of height (L) to diameter (D) are 1 and 0.5, the permeance curves are illustrated by A and C, respectively, in FIG. 3. Likewise, a spherical form is represented by B. At this time, the surface magnetic flux density ($B_0$) of the particle is considerably reduced when Hc=2.4 kOe, whatever forms it takes, as shown in FIG. 3. To put it another way, if the bending point of the magnetization curve is shifted from the working point to the Y (B) axis, then there is a considerable drop of Br. The critical point lies roughly at bHc=3 kOe in the case of the M type Sr ferrite, as determined from FIG. 3. Thus, it is expected that because of bHc=iHc, the iHc of the particle is preferably reduced to 3 kOe by pulverization. (However, it is required that uniaxial anisotropy be kept intact). It is also preferable that the iHc is 0.5 kOe or more, because the final purpose of the present invention is to obtain a permanent magnet; that is, it is required that the soft-magnetized particles be again returned to hard magnetism at the later step. More preferably, the iHc of the particle during the compaction lies generally in the range of 0.5 to 3.5 kOe and that of the M type Sr ferrite particle in particular lies in the range of 1.0 to 3.0 kOe.

Effective to achieve these is to introduce strain in the particle by mechanical pulverization. In this case, it is preferable that anisotropy constants $K_1$ and $K_2$ at an external magnetic field of 20 kOe, determined by the measurement of a torque curve after pulverization, conforms to $$K_2/(K_1+K_2) \geq 0.2$$

It is preferable that this $K_1/K_2$ ratio is 0.3 or more in particular, and 0.3 to 0.5 in general.

Now let θ denote the angle with respect to the C-axis. Then, the magnetic anisotropy energy EA of a hexagonal system is generally represented by $$E_A = K_1 \sin 2\theta + K_2 \sin 4\theta + K_3 \sin 3\theta + \ldots$$

Torque L is given by $-dE_A/d\theta$, and the anisotropy within the C plane is generally small and so is well found by quartic approximation. Accordingly, L is found by the following calculation equation:

$$L = -(K_1+K_2) \sin 2\theta + 1/2\, K_2 \sin 4\theta + \ldots$$

It is desired that the crystal magnetic anisotropy of a hexagonal M type ferrite be uniaxial (diad symmetry; sin 2θ compnent alone). The crystal strain of the M type of Sr ferrite fine grain due to pulverization is expected to have a strong influence on crystal magnetic anisotropy; that is, it is possible to see the crystal strain of the SrM fine grain due to pulverization, if the ratio of the 40 to 20 component in Equation (2), i.e., $K_2/(K_1+K_2)$ is measured.

Torque curves of Sr ferrite fine grains prepared under various conditions are measured at a high magnetic field of 18 to 27 kOe with the use of a high-sensitivity torque magnetometer. To do this, a sample is prepared by putting 0.15 to 1.5 mg of fine grains in a vessel of 6 mm in inner diameter and 2 mm in depth together with paraffin, placing the vessel onto a hot plate to melt the paraffin, and fixing the fine grains together in a magnetic field of 20 kOe. The torque curves are then subjected to Fourier analysis to determine the 20 and 40 components.

Various procedures have been known for the quantitative determination of strains by X-ray diffraction, but it is preferable to use how to achieve the separation between crystallite size and strain with Fourier analysis by Warren and Averbach (cf. *J. Appl.Phys.*, Vol. 20, page 595 (1950)). Of numerous diffraction planes of the hexagonal ferrite, the strain $<\epsilon L^2>$ of the (206) plane matches best with the magnitude of iHc. Then, using Sr ferrite annealed at sufficiently high temperatures as the standard sample, the strain $<\epsilon L^2>$ of the (206) plane is calculated according to the reference literature mentioned above or other literature such as *Clay Science*, 18 4, 144–151 (1978).

The strain of the (206) plane of the particle lies in the range of $1\times10^{-4}$ or more, particularly $2\times10^{-4}$ to $10\times10^{-4}$ and more particularly $3\times10^{-4}$ to $7\times10^{-4}$, as measured by X-ray diffraction.

It is noted that as the iHc of Sr or other ferrite particles is reduced by strains caused by pulverization, another effect that the amount of an iHc change with respect to temperature is reduced is achieved as well. The temperature coefficient of iHc is reduced to about 1 to 6 Oe/° C. at −100 to +150° C. Alternatively, a coarser raw hexagonal system ferrite material may be used as well; that is, it may be reduced in size by pulverization after calcination. When such a coarser ferrite material is reduced in size by pulverization, but when their own iHc is lower than about 3.5 kOe, it is not always required to reduce that iHc. However, some strains are introduced in them by pulverization.

For such pulverization, for instance, it is preferred to carry out dry pulverization, thereby introducing sufficient crystal strains in the grains. For pulverizers used for dry pulverization, a dry type vibration mill, a dry type attritor (a media agitating mill), a dry type ball mill or other equipment may be used, but the most preference is given to using a dry type vibration mill.

The grains are dry-pulverized until the BET specific surface areas are increased to about 2 to 10 times as large, thereby introducing in the (206) planes crystal strains of, say, about $3\times10^{-4}$ to $7\times10^{-4}$. In this case, the dry-pulverized powders have a mean grain diameter of about 0.1 to 1 μm and a BET specific surface area of about 4 to 10 m²/g with the CV of grain diameters maintained at 80% or less, especially, 10 to 70%.

Then, the dry-pulverized powders are usually wet-pulverized. This wet pulverization enables the BET specific surface area to be decreased to about 1 to 4 times as large, especially, 1 to 3 times as large, and the powders to have a mean grain diameter of 0.1 to 0.8 μm and a BET specific surface area of 6 to 12 m$^2$/g, while the CV is maintained at 80% or less, especially, 10 to 70%. Even with this wet pulverization, crystal strains are increased, and the final ferrite grains are regulated to the above-mentioned iHc in the amount of strains of $10^{-4}$ or more. It is noted that such strain amounts or Hc may be obtained by wet pulverization alone or without recourse to dry pulverization, and so the pulverization may be carried out by wet pulverization alone. It is also noted that after the completion of pulverization, the as value lies at 50 to 75 emu/g and at about 50 to 70 emu/g in the case of the M type Sr ferrite in particular. For such wet pulverization, a ball mill, an attritor, a vibration mill or other equipment may be suitably used.

In the first aspect of the present invention, it is preferable that a non-aqueous solvent is used as the solvent for a slurry for such wet pulverization. The non-aqueous solvents used may be organic ones that are liquids at normal temperature such as a variety of organic solvents, typically represented by:

- hydrocarbons such as heptane, industrial gasoline, kerosene, cyclohexanone, toluene, xylene, ethylbenzene, and turpentine oil;
- halogenated hydrocarbons such as 1,2-dibromoethane, tetrachloroethylene, perchloroethylene, dichloropentane, and monochlorobenzene;
- monovalent alcohols, phenols and ethers such as methanol, ethanol, n-propyl alcohol, n-butyl alcohol, cyclohexanol, phenol, and n-butyl ether;
- acids and esters such as butyl acetate;
- polyvalent alcohols and their ethers and esters such as ethylene glycol;
- aldehydes, acetals and ketones such as acetone, methyl ethyl ketone, methyl isobutyl ketone, and cyclohexanone;
- silicone oils such as low-viscosity silicone oil;
- nitrogenous compounds such as ethylene-diamine;
- sulfur compounds such as carbon disulfide; and
- paint thinners such as lacquer thinner.

These solvents may be used in admixture. In this case, such a non-aqueous solvent or solvents should preferably have a viscosity of 0.3 to 3 cps, preferably 0.3 to 2.0 cps, more preferably, 0.4 to 1.5 cps at 20° C. This enables compactibility or the degree of orientation of the compact to be much considerably improved. Preferably, the non-aqueous solvent has a vapor pressure of 0.1 to 200 mmHg, more particularly 1 to 200 mmHg at 200C and a boiling point of 50 to 300° C., more particularly 50 to 200° C. In connection with wet pulverization, it is also preferred that the non-aqueous solvent accounts for about 10 to 90% by weight of the slurry and the ferrite grains account for 10 to 90% by weight of the slurry.

For such wet pulverization, at least one surface active agent should preferably be added to the slurry. The amount of the surface active agent added should preferably lie at 0.1 to 5.0% by weight, especially, 0.3 to 3.0% by weight with respect to the dry-pulverized raw material powders. In general, this surfactant is so amphiphatic that it can be adsorbed onto the surface of the ferrite particles of the raw powders in the slurry and solubilized in the non-aqueous solvent used in an adsorbed state. In other words, this usually includes a hydrophilic group capable of being adsorbed onto the surfaces of the ferrite grains and an affinitive (hydrophobic) group capable of dissolving in the non-aqueous solvent used. Then, it is preferred that the solubility parameter (SP value) of the surfactant used is approximate to that of the non-aqueous solvent used. It is also preferred that the surfactant is adsorbed onto the raw powders in a nearly all amount in the slurry. Such adsorption and solubilization give rise to micelle formation, which in turn enables the primary grains to be well dispersed in the slurry after wet pulverization. Then, the dispersion is wet-compacted in a magnetic field, whereby the degree of orientation is much considerably improved.

Use may be made of all surface active agents including cationic, anionic, nonionic and amphoteric surfactants, but preference is given to using a surface active agent containing at least one saturated or unsaturated fatty acid having about 4 to 30 carbon atoms or its salt, especially, carboxylic acid or its acid, for instance, stearic acid, oleic acid, zinc stearate, calcium stearate, strontium stearate, barium stearate, magnesium stearate, aluminium stearate, zinc oleate, calcium oleate, strontium oleate, barium oleate, magnesium oleate, aluminum oleate and ammonium oleate. Of these, the most preference is given to using the fatty acid, in particular, the calcium salt of stearic acid, because desolvation during the compaction is improved without doing damage to the degree of orientation, so that the compact cannot crack. For instance, this appears to be because its compact decreases in density from 3.0 g/m$^3$ to 2.8 g/m$^3$, so that the solvent is likely to be released therefrom. In particular, it is also possible to disperse such effective elements as may possibly be added to the ferrite, for instance, Ca, Ba, Sr, Al, Cr, Ga, Cu, Zn, Mn, Co and Ti, around each ferrite grain with high efficiency by the addition of organic materials containing those elements (metal salts of organic surfactants such as metal salts of the fatty acids mentioned above). In addition, use may suitably be made of at least one of known sulfonic acids or their salts, sulfates or their salts, phosphates or their salts, aliphatic amine salts or their quaternary ammonium, aromatic quaternary ammonium salts, pyridinium salts, imidazolium salts, betaines, aminocarboxylic acids, imidazoline salts, and naturally occurring surfactants.

If such a surface active agent is added to the slurry of the raw powders in the organic solvent for wet pulverization, then that slurry can be used as such for wet compaction. Alternatively, the surface active agent may be partly or wholly added to the calcimined powders during their dry pulverization that is carried out prior to the wet compaction or by itself. Further, a part or the whole of the surface active agent may be added to the non-aqueous solvent slurry after the wet pulverization thereof. Still further, the surface active agent and non-aqueous solvent may be added to the dry-pulverized powders to prepare the slurry for the wet compaction. In either case, since the surface active agent is allowed to exist in the slurry during the wet compaction in a magnetic field, the effect on improving the degree of orientation of the compact is likewise achieved according to the present invention. It is noted that in what amounts the surface active agent is used at the respective steps may be determined such that it is finally contained in the slurry for wet compaction in the amount already mentioned.

In the present invention, the rest of SiO$_2$ may be used in the pulverization of the calcined powders, as already mentioned. This SiO$_2$ may be added to the raw material feed at the time of either dry or wet pulverization, and should more preferably be used along with the surface active agent. The most preference is given to carrying out wet pulverization with the non-aqueous solvent in the presence of the surface active agent and $SiO_2$. Hence, it is usually preferable to use the rest of $SiO_2$ together with the surfactant in carrying out dry pulverization.

Thus, the content of $SiO_2$ in the magnet is made proper by using additional $SiO_2$ at the time of pulverization, so that good-enough magnet properties are achievable. Such effect is much more enhanced when wet pulverization is carried out while $SiO_2$, the surface active agent and the non-aqueous solvent are all allowed to exist concurrently in the system. However, when only the required amount of $SiO_2$ is added to the raw materials during their mixing or blending, no sufficient magnet properties will be obtainable. In addition, when $SiO_2$ is used in such an amount that would make the resultant magnet properties satisfactory, the calcined powders will contain too much $SiO_2$, giving rise to a drop of the iHc value. In connection with the addition of $SiO_2$ carried out at the time of pulverization, it is also preferable to use the above-mentioned Ca (e.g., $CaCO_3$), Sr and Ba components simultaneously. Notice that these Ca (e.g., $CaCO_3$), Sr and Ba components should be properly contained in the resultant ferrite magnet in the total quantity of 0.2 to 3% by weight.

According to another embodiment of the present invention, the wet pulverization mentioned above is carried out in another solvent, which is then substituted by the non-aqueous solvent mentioned above prior to wet compaction. For the solvents used for this wet pulverization, not only are the non-aqueous solvents mentioned above usable, but water or a mixture of water with solvents is suitably usable because of their handleability or for other reasons. At this time, the amount of the raw powders in the slurry during the wet pulverization lies at about 10 to 70% by weight. However, it is understood that no improvement in the degree of orientation of the compact is achievable by adding the surface active agent to the aqueous slurry for wet compaction, and this is the reason the solvent is substituted by the non-aqueous solvent. For this solvent substitution, for instance, decantation or other procedure may be applied, while the raw powders are magnetically maintained. It is noted that this wet compaction may follow dry compaction.

When the wet pulverization is done with a solvent that is different from the slurry solvent used for the wet compaction and is preferably of an aqueous type, followed by solvent substitution, it is required that the surface active agent be present in the amount mentioned above during the final wet compaction. To this end, the surface active agent may be used at any one of the dry pulverization, wet pulverization and final slurry preparation steps. In either case, the slurry for the final wet compaction should be regulated such that it contains the non-aqueous solvent in an amount of about 5 to 30% by weight and the raw particles in an amount of about 70 to 95 % by weight. Here, too, the rest of $SiO_2$ may be added in the manner mentioned above.

After the surfactant-containing final non-aqueous solvent slurry has been prepared in this manner, the slurry is compacted in a magnetic field, while the non-aqueous solvent is removed from it. The solvent may be forcibly removed under reduced pressure as usual, while the compaction pressure may lie at about 0.1 to 0.5 ton/$cm^2$ and the applied magnetic field may be of the order of about 5 to 15 kG. The degree of orientation, Ir/Is, of the obtained compact is 78% or more, for instance, lies at 79 to 84%. Such a high degree of orientation is achieved for the first time by using the non-aqueous solvent in combination with the surface active agent; in other words, this is not achieved by adding the surface active agent to an aqueous slurry.

After that, the compact is thermally treated at a temperature of 100 to 500° C. in the atmosphere or nitrogen to decompose the added surface active agent sufficiently for removal. Then, this compact is sintered in the atmosphere, for instance, at a temperature of 1150 to 1250° C., especially, 1160 to 1200° C. for about 0.5 to 3 hours, whereby various forms of anisotropic ferrite magnets according to the present invention are obtained.

SEM fractography indicates that the obtained magnets have a mean grain diameter of about 0.5 to 0.9 μm with a CV value of 80% or less, and their sintered densities lie at 95% or more, especially, 96–99%, in terms of relative density. In the case of the M type Sr ferrite in particular, its Br can be 4400 G, its iHc 4000 to 4200 Oe, its Ir/Is 96% or more, especially, 97–98%, and its Hk/iHc 90 to 95%.

According to the second aspect of the present invention, mechanical strains alone are introduced in the particles by pulverization without recourse to any surface active agent. As already mentioned, pulverization is done either wet or dry. For the solvent for the slurry that is preferably wet-pulverized, however, preference is given to using water or its mixture with a solvent, because they are easy to handle. For wet pulverization, the solvent accounts for about 10 to 90% by weight of the slurry, and accounts for 30 to 90% by weight of the aqueous slurry in particular. The ferrite particles account for 10 to 90% by weight of the slurry, and 10 to 70% by weight of the aqueous slurry in particular.

If such a water or aqueous slurry is wet-pulverized, then the slurry can be wet-compacted as such. As mentioned above, the calcined powders may be dry-pulverized prior to the wet compaction. Alternatively, the solvent may be added to the dry-pulverized powders to prepare a slurry for the wet compaction. In addition, the wet pulverization mentioned above may be done in another solvent different from that of the slurry for the compaction, and prior to the wet compaction, the solvent used for pulverization may then be substituted by water. The solvent substitution may be done as by decantation, while the raw powders are magnetically held. It is noted that for this wet compaction, dry pulverization may have been done in advance. In either case, the final slurry for the wet compaction should be regulated such that it contains the solvent such as water in an amount of about 5 to 30% by weight and the raw particles in an amount of about 70 to 95% by weight.

It is noted that when the aqueous slurry is wet-pulverized, a dispersant is preferably added to it during the pulverization. Preferable to this end are high-molecular dispersants, and the most preference is given to one based on ammonium polycarboxylate. It is also preferred that the dispersant is added to the raw powders in an amount of 0.1 to 1% by weight.

Here, too, it is preferable that the rest of $SiO_2$ is added at the dry or wet pulverization step. No particular limitation is imposed on when this $SiO_2$ is to be used. For instance, when the wet pulverization is carried out, however, it is preferable that $SiO_2$ and the dispersant are allowed to coexist. Hence, it is ordinarily preferable that $SiO_2$ is used during the dry pulverization.

After the final slurry has been prepared in this manner, the slurry is compacted in a magnetic field, while the non-aqueous solvent is removed from it. The solvent may be forcibly removed under reduced pressure as usual, while the compaction pressure may lie at about 0.1 to 0.5 ton/$cm^2$ and the applied magnetic field may be of the order of about 5 to 15 kG. The degree of orientation, Ir/Is, of the obtained compact is 70% or more, for instance, lies at 71 to 74%.

After that, the compact is thermally treated at a temperature of 100 to 500° C. in the atmosphere or nitrogen to decompose the components in the slurry sufficiently for removal. Then, this compact is sintered in the atmosphere, for instance, at a temperature of 1150 to 1250° C., especially, 1160 to 1200° C. for about 0.5 to 3 hours, whereby various forms of anisotropic ferrite magnets according to the present invention are obtained.

SEM fractographs indicate that the obtained magnets have a mean grain diameter of 1.0 μm or less, especially, about 0.5 to 0.9 μm with the CV of 80% or less, and their sintered densities lie at 96% or more, especially, 97–98%, in terms of relative density. In the case of the M type Sr ferrite in particular, its Br can be 4200 G. its iHc 4100 to 4300 Oe, its Ir/Is 93% or more, especially, 94–95%, and its Hk/iHc 90 to 96%.

EXAMPLES

In the ensuing description, the present invention will now be explained, more specifically but not exclusively, with reference to the examples.

Examples 1–3 and Comparative Examples 1–3

Set out below are the starting materials.

Iron oxide ($Fe_2O_3$ with the primary particle diameter lying between 0.1 and 0.5 μm).

Strontium chloride ($SrCl_2 \cdot 6H_2O$, first-grade reagent).

Sodium carbonate ($Na_2CO_3$, guaranteed reagent).

Then, 10.0 kg of iron oxide ($Fe_2O_3$) and 1.12 kg of sodium carbonate ($Na_2CO_3$) were pulverized together with 28 liters of water for three hours by means of an attritor. Subsequently, 5 liters of an aqueous solution of 3.51 kg of strontium chloride ($SrCl_2 \cdot 6H_2O$) were added dropwise into the attritor containing the slurry mentioned above, followed by a further one-hour pulverization, during which the reaction $SrCl_2 + Na_2CO_3 \rightarrow SrCO_3 \downarrow + 2NaCl$ occurred, giving rise to the precipitation of very fine strontium carbonate, which was then mixed with the iron oxide particles with high accuracy. This slurry was washed until the NaCl content was reduced to 0.5% or less, followed by dehydration, drying and granulation. The particles were then calcined at 1100° C. in the air for 3 hours to obtain calcined powders.

The magnetic properties of the obtained powders were measured with a sample vibration type magnetometer (VSM). The results were that σs=71 emu/g and iHc=5.5 kOe. Scanning electron microscope (SEM) fractography revealed that they have a primary particle diameter of about 0.5 μm with a CV value of 20% and a BET specific surface area of 3 $m^2/g$.

Figure 4:
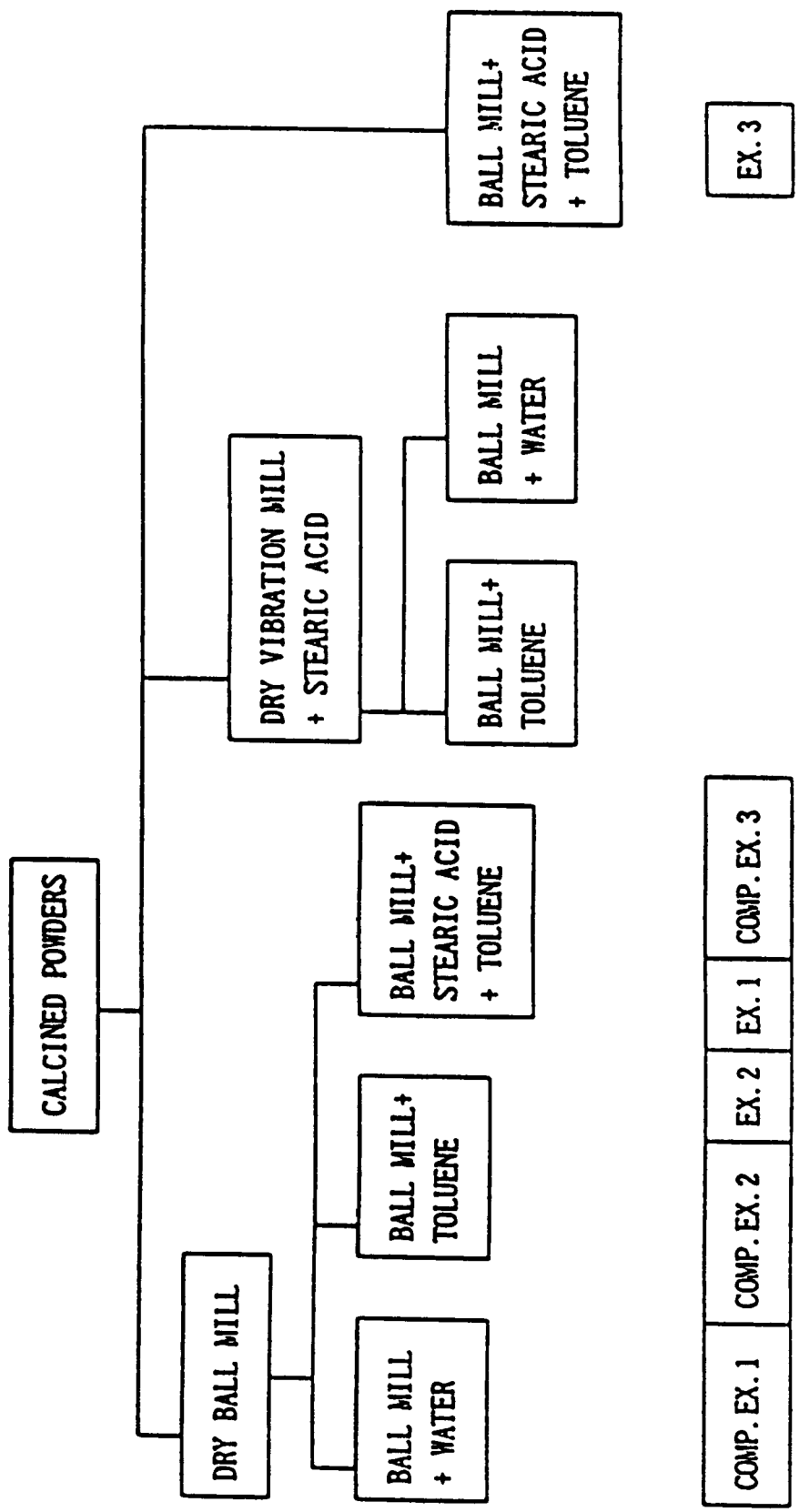
FIG. 4 is a block diagram showin the pulverization processes used in Examples 1–3 and Comparative Examples 1–3.

The calcined powders were pulverized by the process shown in FIG. 4. To this end, stearic acid was used as the surfactant and toluene as the non-aqueous solvent. More specifically, the powders were dry-pulverized by a dry vibration mill or ball mill until the specific surface areas of the ferrite powders reached 9 to 12 $m^2/g$ (Examples 1 & 2 and Comparative Examples 1–3). At this time, strains were introduced in the ferrite powders by pulverization, whereby the iHc was reduced from 5.5 kOe to 2.2–2.6 kOe. When stearic acid was added to the calcined powders for pulverization by a dry vibration rod mill (Example 1 and Comparative Example 3), 2.0% by weight of stearic acid was added to the ferrite powders together with 0.6% by weight of $SiO_2$ and 1.9% by weight of $CaCO_3$. By the addition of stearic acid, the ferrite powders were substantially unlikely to be deposited onto the inner wall of the dry vibration mill or the rod, so that removal of the ferrite powders could easily be achieved.

After that, a toluene slurry (having a ferrite content of 33% by weight) was pulverized by wet ball-milling (Examples 1 & 2). Another sample was prepared by the wet ball mill pulverization of a stearic acid-containing toluene slurry (Example 3). In FIG. 4, there are also illustrated the processes of Comparative Examples 1–3 in which no stearic acid was used and pulverization took place in water. It is noted that in all the processes the amount of stearic acid added was 2% by weight and this was true of the addition of $SiO_2$ and $CaCO_3$ as well. The ferrite powders of Example 1 after ball mill pulverization were observed by means of the SEM, and about 200 crystal grains were measured in terms of their sizes. As illustrated in FIG. 4, the results were that the mean particle diameter is 0.25 μm and the coefficient of variation is 40%. Also, the magnetic properties of the powders of Examples 1–3 and Comparative Examples 1–3 after wet ball mill pulverization were measured by the VSM. The results are set out in Table 2.

TABLE 2

Properties of Powders

| Sample Nos. | | Properties of Powders After the Completion of Wet Pulverization | | |
|---|---|---|---|---|
| | | σs (emu/g) | iHc (Oe) | BET Specific Surface Area ($m^2/g$) |
| Comp. Ex. | 1 | 61.0 | 2340 | 10.7 |
| | 2 | 62.0 | 2380 | 9.1 |
| | 3 | 59.0 | 2220 | 12.4 |
| Example | 1 | 62.0 | 2240 | 10.4 |
| | 2 | | 2410 | 9.0 |
| | 3 | 59.0 | 2220 | 9.3 |

Thus, the iHc of the powders after pulverization was reduced, but the strain of the (206) plane of each ferrite powder was found to be $4 \times 10^{-4}$ to $7 \times 10^{-4}$ or more by X-ray diffractometry and calculation according to Warren and Averbach's method. From this result, it is evident that the larger the strain, the lower the iHc and the cause for the iHc reduction is the strain introduced by pulverization. As a result of the iHc reduction, the temperature properties were increased as well.

Further, $K_1$ and $K_2$ were found at 20 kOe, and substitution of these into $K_2/(K_1+K_2)$ gave 0.4 to 0.5 in Example 1 and 0.4 to 0.5 in Example 2, respectively.

The concentration of ferrite in this pulverized slurry was regulated to about 80% by weight by suction filtration. While the solvent was removed from the slurry, it was compacted in a magnetic field of about 13 kG into a columnar member of 30 mm in diameter and 15 mm in height. The degree of orientation of the columnar compact was largely improved or reached as high as 80% by the addition of stearic acid and pulverization carried out in toluene, as set out in Table 3. It is noted that no improvement in the degree of orientation is achieved by adding stearic acid to an aqueous slurry.

TABLE 3

Degree of Orientation of Compacts (Ir/Is)

| Comp. 1 | Comp. 2 | Comp 3 | Example 1 | Example 2 | Example 3 |
|---|---|---|---|---|---|
| 72% | 69% | 80% | 80% | 72% | 80% |

Figure 5:
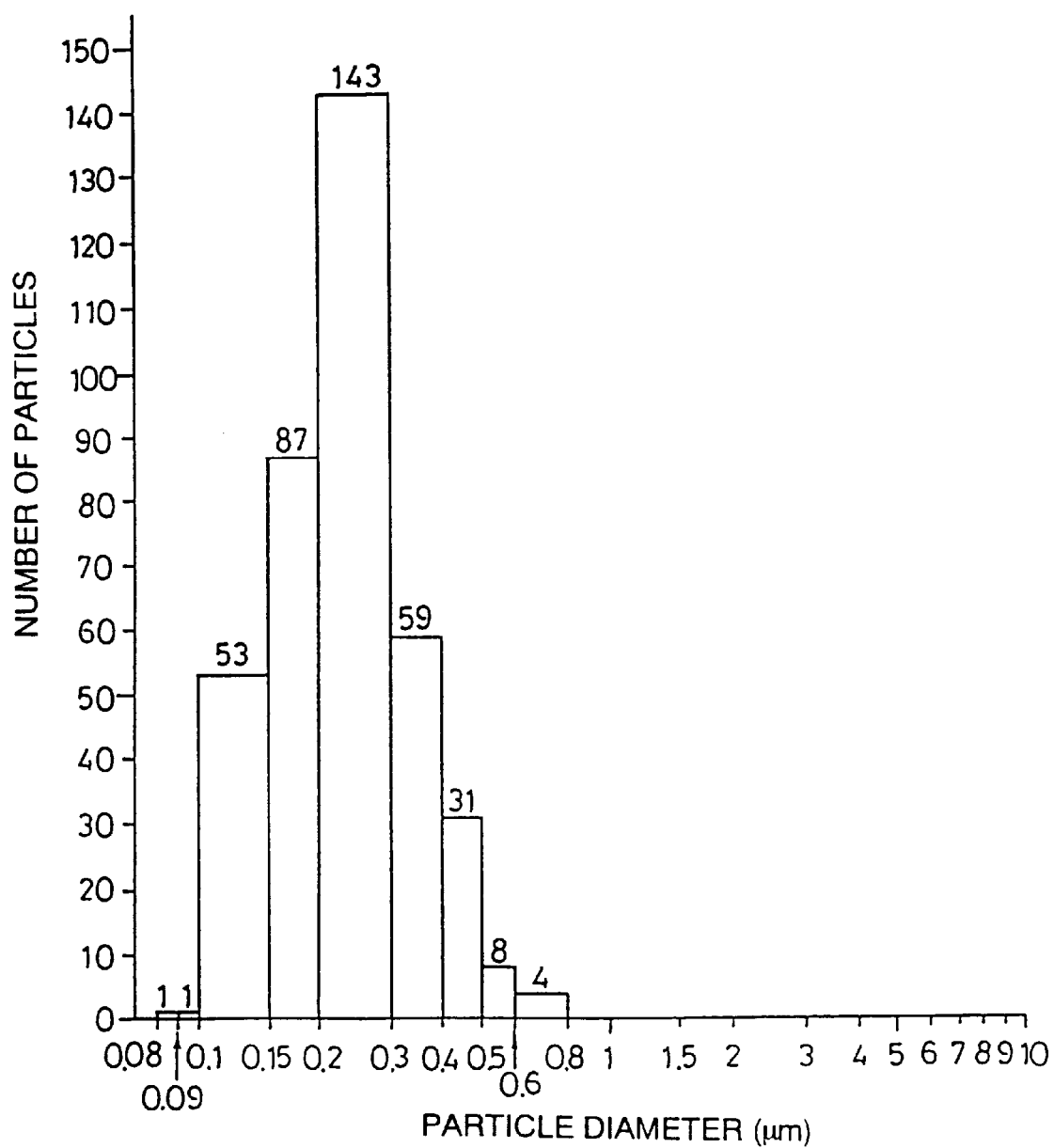
FIG. 5 is a histogram showing the post-pulverization particle size distribution of the particles in Example 1.
Figure 6:
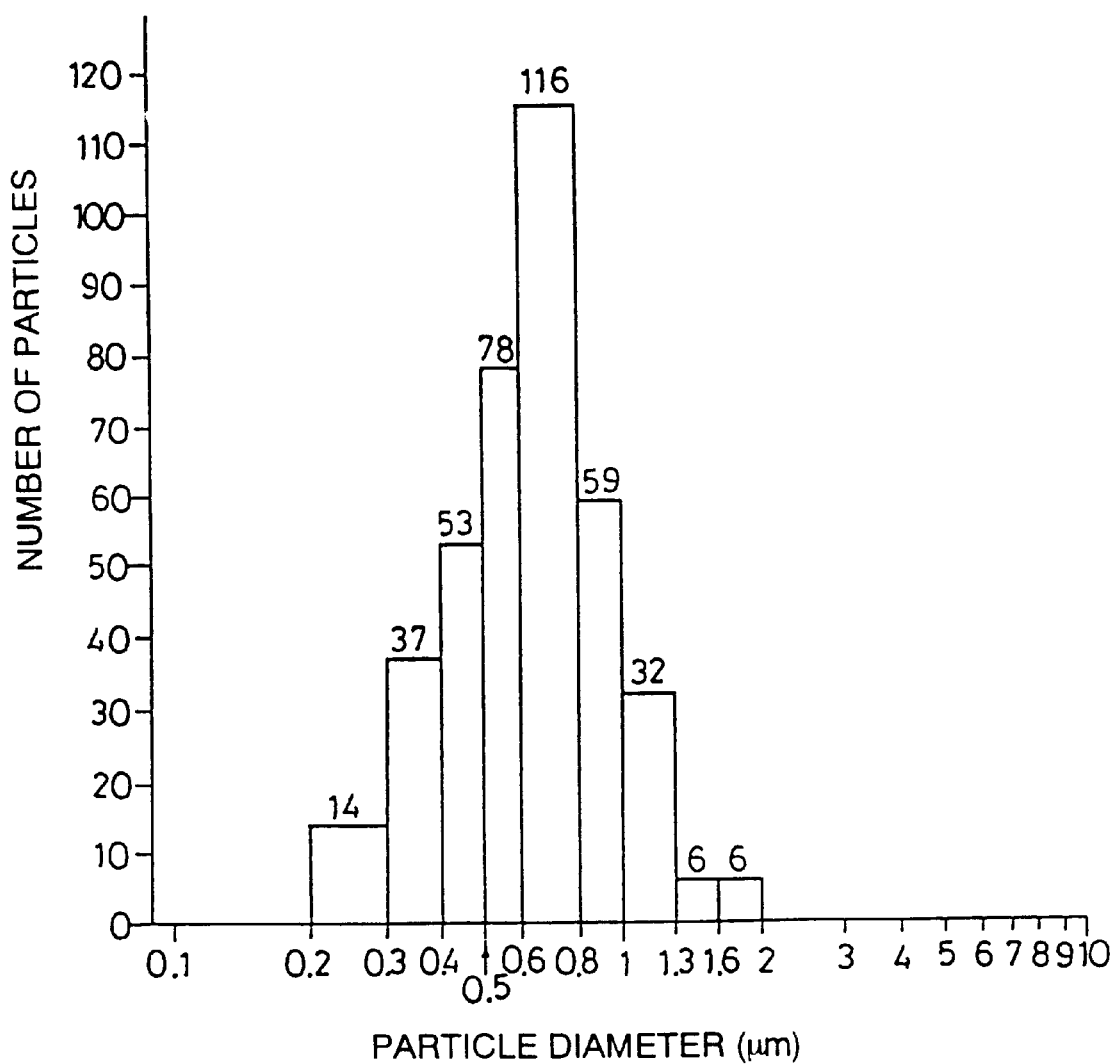
FIG. 6 is a histogram showing the grain size distribution of the sintered compact obtained by sintering the compact of Example 1.

Then, the compacts of Example 1 and Comparative Example 1 were sintered in the air at 1180° C. for 1 hour. It is noted that the compact of Example 1 was sintered after well degreased in the air at 100 to 400° C. for stearic acid removal. The properties of the obtained sintered compacts were estimated. As illustrated in Table 4, higher magnetic properties, say, Br=4350 G and iHc=4310 Oe, were obtained. The compact sintered at 1180° C. according to Example 1 were observed by SEM fractography, and about 200 crystal grains were measured in terms of their size. As illustrated in FIG. 5, the results were that the mean grain diameter was 0.67 µm with a coefficient of variation of 42%.

TABLE 4

| | Properties of Sintered Compacts | | | |
|---|---|---|---|---|
| Sample Nos. | Br (G) | iHc (Oe) | Ir/Is (%) | Sintering Densities (g/cm³) |
| Comp. Ex. 1 | 4120 | 4310 | 91.5 | 4.98 |
| Example 1 | 4350 | 4310 | 97.4 | 4.96 |

Example 4

In the process of Example 1, the amount of stearic acid added to the raw particle feed was varied. The results are set out in Table 5.

TABLE 5

| Sample | Amounts of Stearic Acid Added (% by weight) | Compacts Ir/Is (%) |
|---|---|---|
| 21 | 0 | 62 |
| 22 | 2 | 78 |
| 23 | 4 | 78 |
| 24 | 6 | 79 |

Example 5

In the process of Example 3, a compact that had been pulverized in toluene with the addition of stearic acid was well degreased at 100 to 400° C. in the atmosphere and then sintered at 1170 to 1180° C. for 1 hour in the atmosphere. The obtained magnetic properties are set out in Table 6.

TABLE 6

| Sintering Temp. (° C.) | Br (G) | iHc (Oe) | Ir/Is (%) | Sintering Densities (g/cm³) |
|---|---|---|---|---|
| 1170 | 4320 | 4470 | 98.4 | 4.93 |
| 1180 | 4390 | 4230 | 98.7 | 4.97 |

Example 6

In the process of Example 1 zinc stearate and calcium stearate were used in place of stearic acid, and in the process of Example 3 oleic acid was used, all in the amounts of 2% by weight with respect to the ferrite powders.

In the process of Example 1, the degrees of orientation of compacts obtained by using toluene, MEK, ethanol and acetone as the solvents were similarly estimated. The results are set out in Table 7. In all the cases, the degree of orientation as high as 79% or more was achieved.

TABLE 7

| | | | Organic solvents | | | |
|---|---|---|---|---|---|---|
| Surfactant | Time of Addition | Solvent for slurry | Compacts Ir/Is (%) | Vapor pressure (mmHg) | Boiling Point (° C.) | Viscosity (cps) 20° C. |
| Zn Stearate | Dry Pulverization | Toluene | 81 | 22 | 110.6 | 0.587 |
| Ca Stearate | Dry Pulverization | Toluene | 80 | 22 | 110.6 | 0.587 |
| Oleic Acid | Wet Pulverization | Toluene | 83 | 22 | 110.6 | 0.587 |
| Stearic Acid | Wet Pulverization | Toluene | 80 | 22 | 110.6 | 0.587 |
| Stearic Acid | Wet Pulverization | MEK | 80 | 78 | 79.6 | 0.423 |
| Stearic Acid | Wet Pulverization | Etahnol | 79 | 43 | 78.3 | 1.22 |
| Stearic Acid | Wet Pulverization | Acetone | 79 | 180 | 56.5 | 0.30 |

The results shown in Table 7 make the effect of the present invention clear. It is noted that the shapes of the ferrite particles in the compacted slurry were nearly equivalent to those of Example 1. In both the cases where the surface active agent was added to the wet-pulverized powders and the particles were pulverized with a water slurry, followed by solvent substitution, similar effects were obtained.

Example 7

Set out below are the starting materials.

Iron oxide ($Fe_2O_3$ with the primary particle diameter lying between 0.1 and 0.5 µm).

Strontium chloride ($SrCl_2.6H_2O$, first-grade reagent).

Sodium carbonate ($Na_2CO_3$, guaranteed reagent).

Then, 10.0 kg of iron oxide ($Fe_2O_3$) and 1.12 kg of sodium carbonate ($Na_2CO_3$) were pulverized together with 28 liters of water by means of an attritor for three hours. Subsequently, 5 liters of an aqueous solution of 3.51 kg of strontium chloride ($SrCl_2.6H_2O$) were added dropwise into the attritor containing the slurry mentioned above, followed by a further one-hour pulverization, during which the reaction $SrCl_2+Na_2CO_3 \rightarrow SrCO_3\downarrow +2NaCl$ occurred, giving rise to the precipitation of very fine strontium carbonate, which was then mixed with the iron oxide particles with high accuracy. This slurry was washed until the NaCl content was reduced to 0.5% or less, followed by dehydration and drying. The particles were then calcined at 1100° C. in the air for 3 hours.

The magnetic properties of the obtained powders were measured with a sample vibration type magnetometer (VSM). The results were that σs=71 (emu/g) and iHc=5.5 (kOe).

Scanning electron microscope (SEM) fractography showed that they have a primary particle diameter of about 0.5 µm with a CV value of 20% and a BET specific surface area of 3 m²/g.

Figure 2:
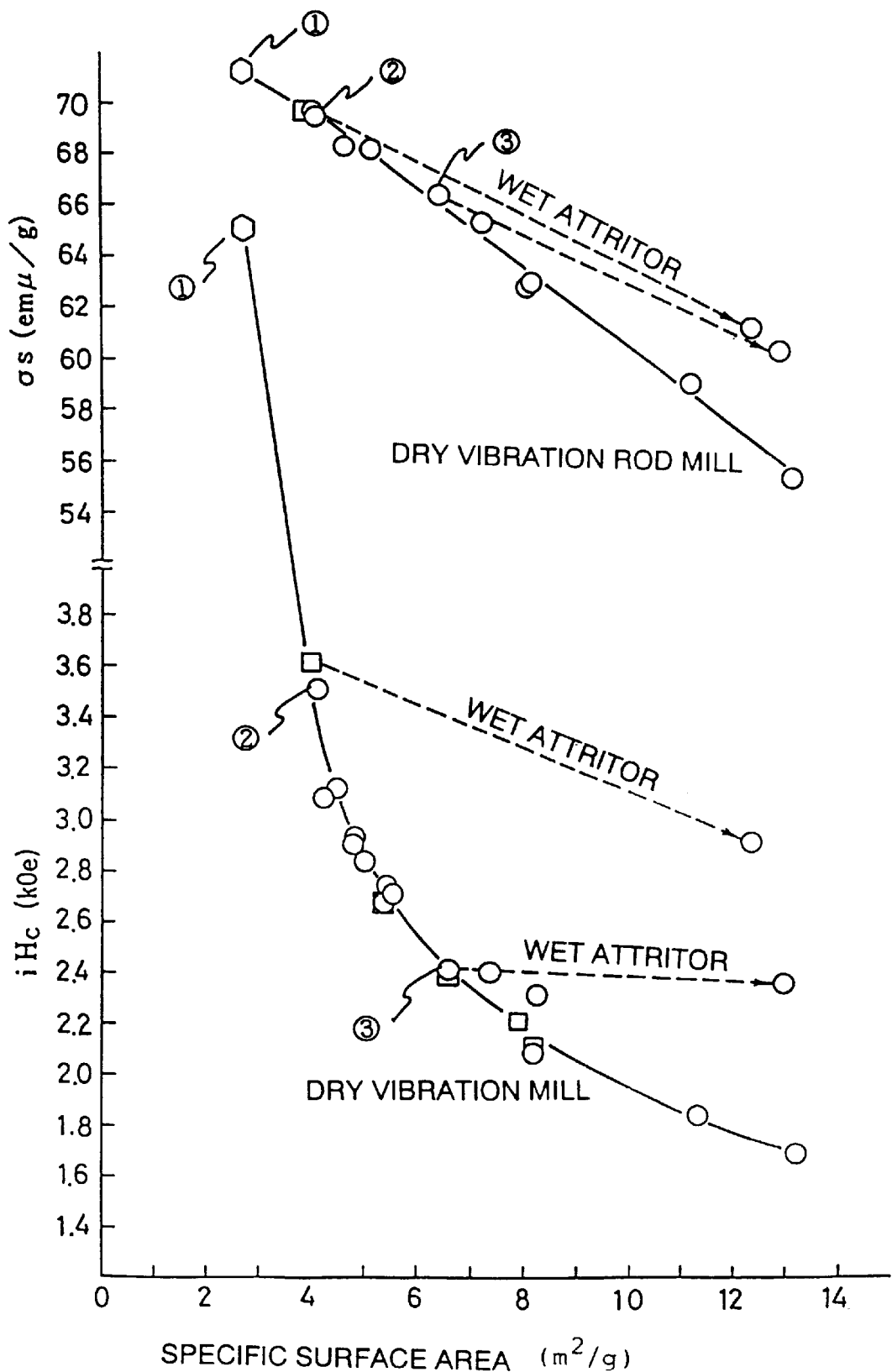
FIG. 2 illustrates graphically changes-by-pulverization in the relation of the as and iHc to specific surface area of M type system ferrite powders.

The principles teach that the smaller the iHc of the pulverized powders, the more preferable the results. For that reason, the magnetic properties of the powders obtained under varied conditions by a different pulverization procedure were measured by VSM (FIG. 2). This revealed that the iHc of the powders is likely to be decreased by dry vibration mill pulverization in particular.

Figure 7:
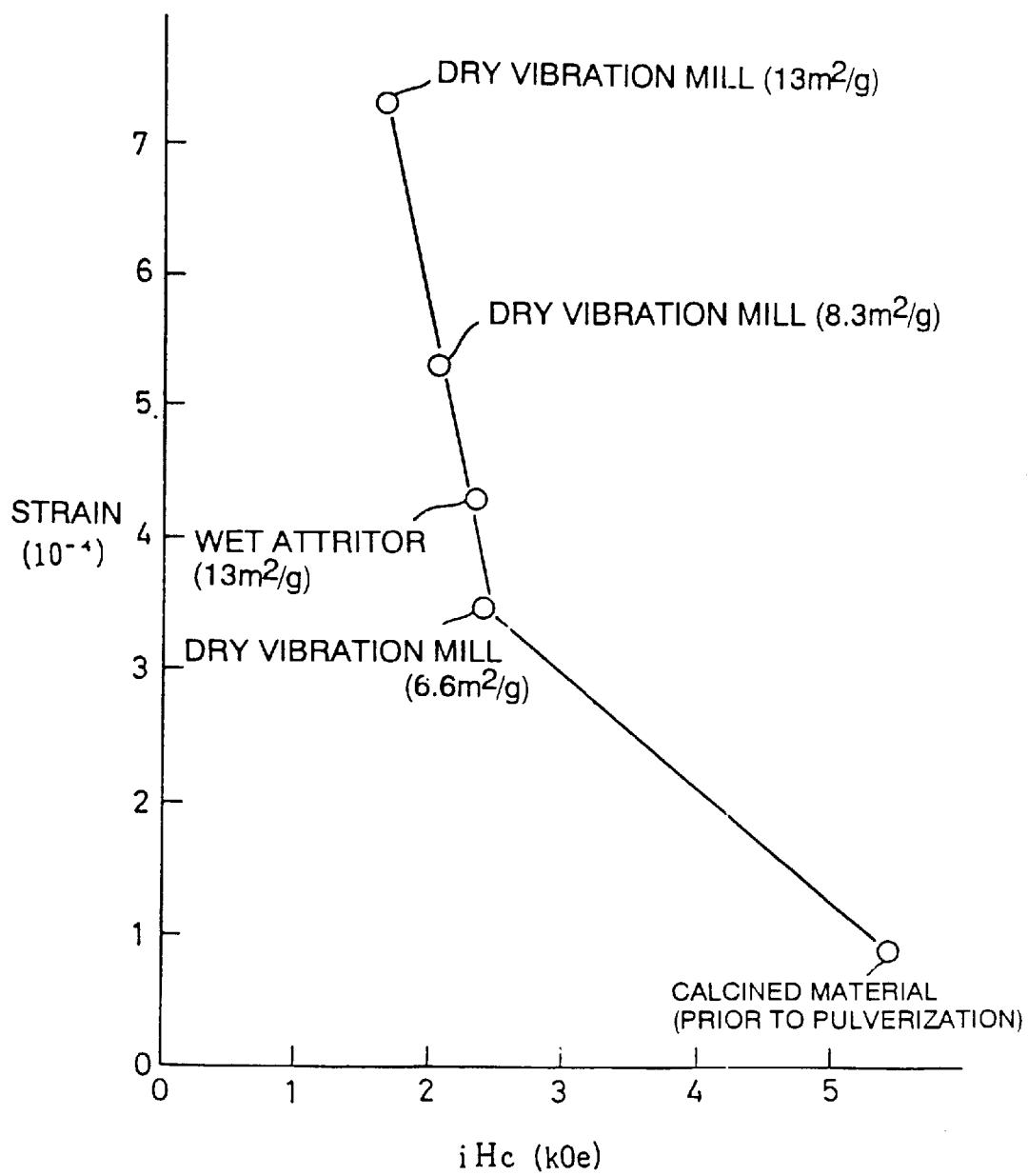
FIG. 7 is a graph showing the relation between strain and iHc.

To determine the cause of this iHc reduction, the X-ray diffraction of ferrite powders having varying iHc was measured, and the strains of the (206) planes were calculated by Warren and Averbach's method (FIG. 7). This revealed that the larger the strains, the smaller the iHc, and so the reason for the iHc reduction believes in the strains introduced by pulverization.

It is noted that the values given by $K_2/(K_1+K_2)$ were 0.1 and 0.3–0.4, as measured before pulverization and after each pulverization step, respectively.

As illustrated in FIG. 2, two kinds of ferrite particles whose iHc's vary were prepared under varied pulverization conditions with a dry vibration rod mill. Four hundred (400) g of each type of ferrite powders, 2.40 g of $SiO_2$ and 6.00 g of $CaCO_3$ were finely pulverized together with 2.0 liters of water for 70 minutes by means of a wet attritor. The thus finely pulverized powders have such properties as set out in Table 8.

TABLE 8

| Sample | Conditions for dry vibration rod mill pulverization | | Properties of the completion of time pulverization | | |
|---|---|---|---|---|---|
| | Throughput (g) | Time (min) | σs (emu/g) | iHc (oe) | SBET ($m^2/g$) |
| 81 | 1000 | 30 | 60.9 | 2840 | 12.5 |
| 82 | 150 | 20 | 59.9 | 2330 | 13.1 |

After dehydration, the thus pulverized slurry was wet-compacted in a magnetic field of about 13 KG into a columnar member of 30 mm in diameter and 15 mm in height. Subsequently, this compact member was sintered in the air at 1180° C. for 1 hour, and the properties of the resultant sintered compact were assayed. The results are set out in Table 9.

TABLE 9

| Samples | Br (G) | iHc (Oe) | Ir/Is (%) | Hk/iHc (%) | Sintering Densities ($g/cm^3$) |
|---|---|---|---|---|---|
| 81 | 3940 | 4280 | 89.9 | 88.0 | 4.94 |
| 82 | 4040 | 4220 | 92.6 | 91.5 | 4.92 |

As will be appreciated from this table, the degrees of orientation of ferrite particles are improved by decreasing their iHc at the compaction state in a magnetic field, resulting in an improvement in Br.

In the preparation of Sample 2 with a decreased iHc, 0.4% of an ammonium polycarboxylate salt type dispersant (SN Dispersant 5468 made by Sannopuko K.K.) were added to ferrite particles, while they were finely pulverized by means of a wet attritor (Sample 3). Set out in Table 10 are the properties of the powders after the completion of the pulverization.

TABLE 10

Properties of Powder
(with the addition of dispersant)

| Sample | Conditions for dry vibration rod mill pulverization | | Properties of the completion of time pulverization | | |
|---|---|---|---|---|---|
| | Throughput (g) | Time (min) | σs (emu/g) | iHc (Oe) | SBET ($m^2/g$) |
| 83 | 150 | 20 | 59.9 | 2360 | 12.0 |

After that, a sintered compact was prepared as mentioned above, and its properties were assayed. The results are set out in Table 11.

TABLE 11

Properties of Sintered Compact
(with the addition of dispersant)

| Samples | Br (G) | iHc (Oe) | Ir/Is (%) | Hk/iHc (%) | Sintering Densities ($g/cm^3$) |
|---|---|---|---|---|---|
| 83 | 4180 | 4250 | 94.4 | 96.3 | 4.93 |

As will be understood from this table, further improvements were so introduced in orientation that higher properties than ever before can be obtained.

Example 8

Figure 8:
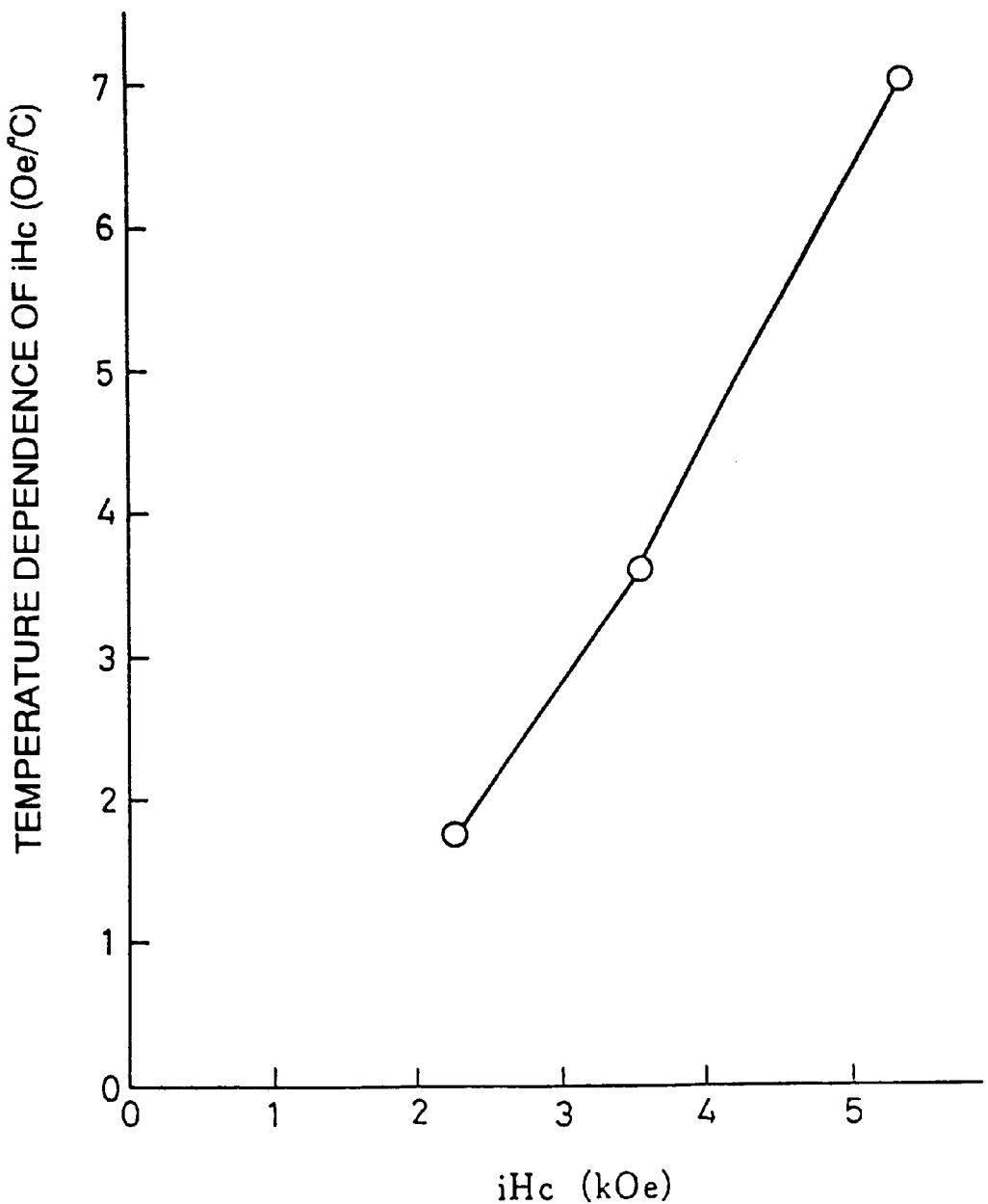
FIG. 8 is a graph showing the relation between strain and the temperature dependence of iHc.
Figure 9:
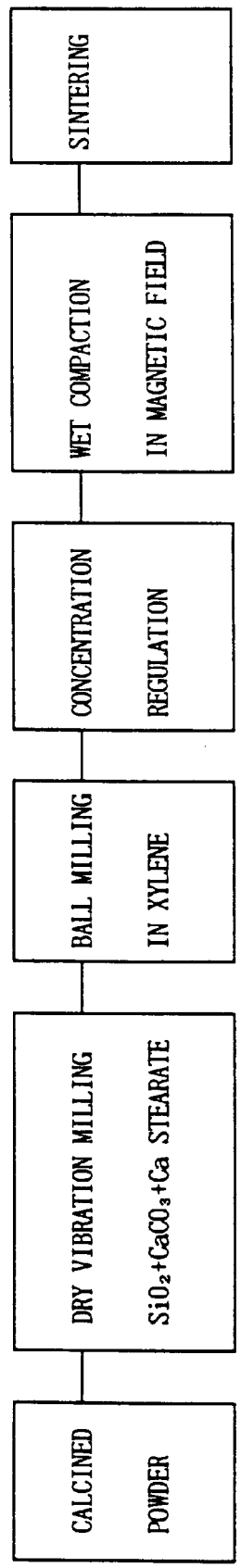
FIG. 9 is a block diagram showing the pulverization process used in Example 9.

Sr ferrite powders (σs=71 emu/g and iHc=5.5 kOe) prepared as in Example 7 were pulverized by means of a dry vibration mill. Changes in the magnetic properties of the powders having a decreased iHc by pulverization strains depending upon temperature were measured in the range of −100 to +150° C. by means of a vibration magnetometer (VSM). As a result, some considerable improvements were obtained in this regard, as shown in FIG. 8.

Example 9

Set out below is the starting material feed composition (commercially available general-purpose material feed).

Iron oxide ($Fe_2O_3$ with a primary particle diameter of 0.1 to 1 μm and a mean particle diameter of 0.5 μm)

Strontium carbonate ($SrCO_3$ with a primary particle diameter of 0.5 to 2 μm and a mean particle diameter of 1 μm)

One thousand (1000) g of iron oxide and 161.2 g of strontium carbonate were pulverized together with 2 liters of water by an attritor for 2 hours, during which $SiO_2$ (with a specific surface area of about 100 $m^2/g$) was added to the starting feed in the respective amounts of 0, 0.1, 0.2, 0.4 and 0.6% by weight with respect to the resulting ferrite. At the same time, $CaCO_3$ (with a mean particle diameter of 1 μm) was added to the starting feed at a molar Ca/Si ratio of 0.5, but this was not applied to the feed free from $SiO_2$. The starting feed contained 0% by weight of $SiO_2$ and about 0.35% by weight of $CaCO_3$ as impurities. After drying and granulation, the pulverized slurry was calcined in the air at 1175° C. for 3 15 hours. The mean particle diameter of the primary particles of the thus obtained calcined powders was found to be 0.3 to 0.6 μm by SEM fractography. Also, the content of $SiO_2$ and the molar Ca/Si ratio in the calcined powders were found by chemical analysis. In addition, the magnetic properties of the calcined powders were measured by VSM.

These results are shown in Table 12.

TABLE 12

Properties of Calcined Powder

| Sample No. | Amount of $SiO_2$ (wt %; vs. the resultant ferrite) | Amount of $SiO_2$ (wt %) | Ca/Si (as analyzed) | σs (emu/g) | iHc (kOe) |
|---|---|---|---|---|---|
| 91 | 0 | 0.00 | — | 70.4 | 5.46 |
| 92 | 0.1 | 0.07 | 1.2 | 70.5 | 5.52 |
| 93 | 0.2 | 0.15 | 1.1 | 70.3 | 5.49 |

TABLE 12-continued

Properties of Calcined Powder

| Sample No. | Amount of $SiO_2$ (wt %; vs. the resultant ferrite) | Amount of $SiO_2$ (wt %) | Ca/Si (as analyzed) | σs (emu/g) | iHc (kOe) |
| --- | --- | --- | --- | --- | --- |
| 94 | 0.4 | 0.32 | 0.7 | 70.5 | 5.07 |

Then, these calcined powders were first pulverized by a dry vibration mill according to the process illustrated in FIG. 1.

In this case, the quantities of $SiO_2$ and $CaCO_3$ added were determined such that the respective total amounts (i.e., the first plus second additions) were 0.6% by weight and 1.15% by weight. In all the cases 2.0% by weight of calcium stearate was used. By this dry pulverization, the BET value of the ferrite powders were regulated to 8 to 10 m²/g. At this time, the iHc values of the ferrite powders were all reduced to 1.8 to 2.5 kOe by the introduction of strains-by-pulverization. Also, the values expressed by $K_1/(K_1+K_2)$ were 0.3 to 0.4.

After that, a xylene slurry (with a ferrite concentration of 33% by weight) was wet-pulverized by ball milling.

This pulverized slurry was then regulated to a ferrite concentration of about 80% by weight by suction filtration. While the solvent was removed from the slurry, it was compacted in a magnetic field of about 13 kG into a columnar member of 30 mm in diameter and 15 mm in height. The thus obtained compacts were sintered at 1190° C. in the air for 1 hour.

Figure 10:
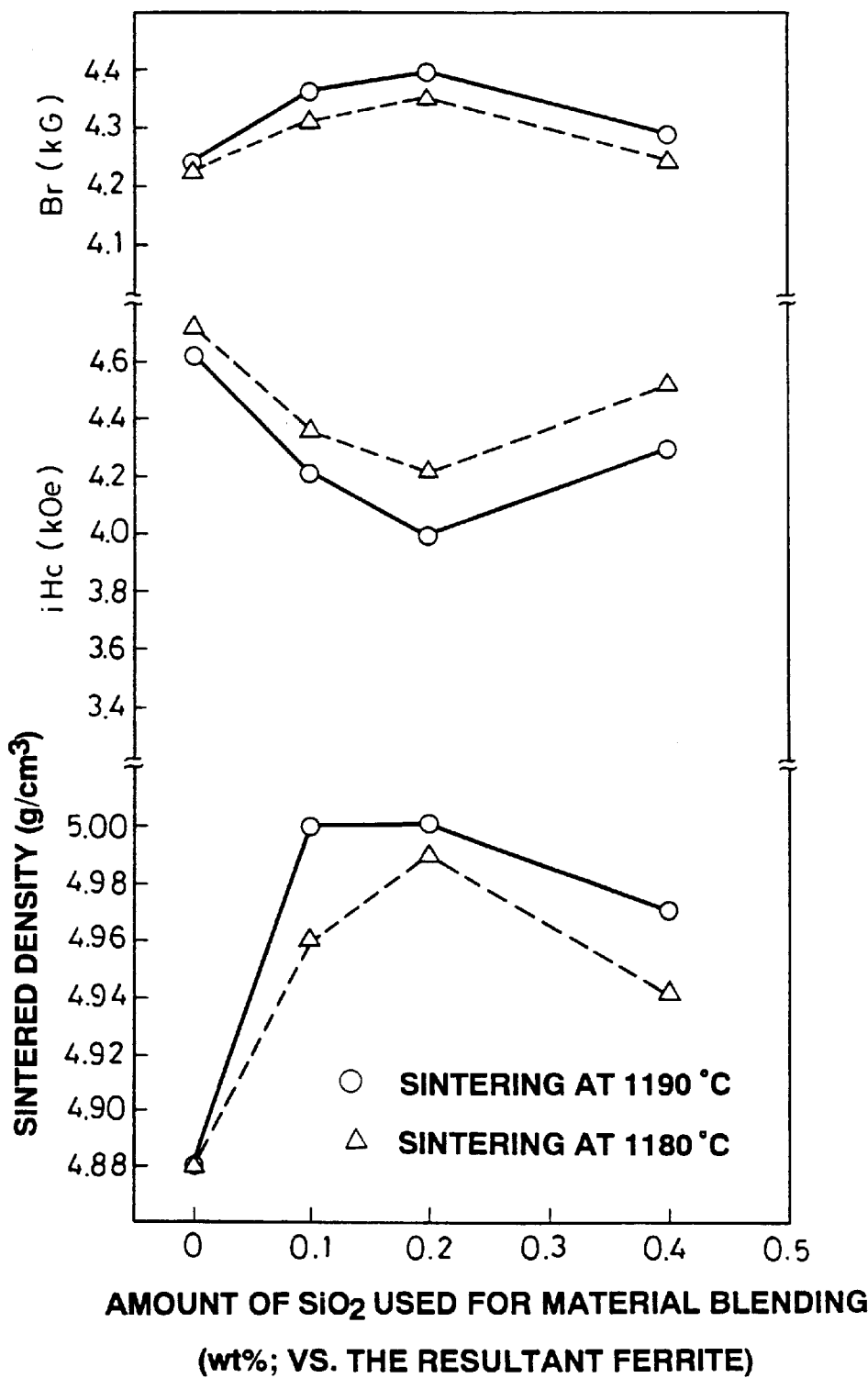
FIG. 10 is a graph showing the relations between the amount of $SiO_2$ at the time of material blending (in % by weight; vs. the resulting ferrite) and the sintered density, and between iHc and Br.

The sintered density, Br and iHc of the obtained sintered bodies were measured, with the results shown in FIG. 10. As can be seen from FIG. 10, the sintered body is considerably improved in terms of density and Br by adding 0.1 to 0.2% by weight of $SiO_2$ to the starting feed at its initial blending stage. Thus, it is found that a high sintered density as well as high magnetic properties expressed in terms of Br of 4.4 kG and iHc of 4.0 kOe are achievable by adding the additives both at the blending stage and at the pulverizing stage. The degree of orientation was also about 97%.

Example 10

Figure 11:
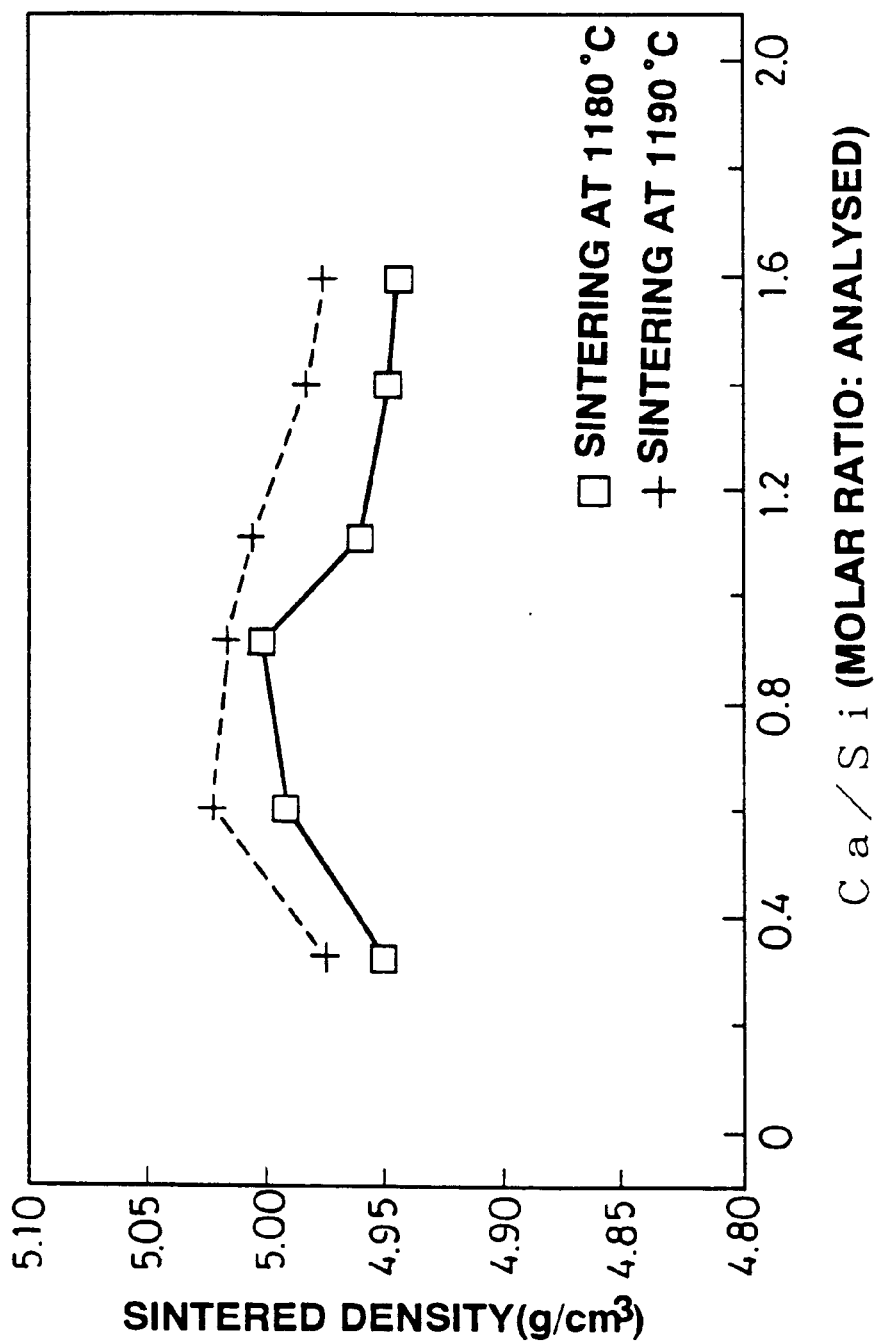
FIG. 11 is a graph showing the relation between the molar Ca/Si ratio (as analyzed) in the calcined powders and the sintered density.

Sintered material was prepared following the procedures of Example 9 with the exception that the amount of $CaCO_3$—that was added simultaneously with 0.2% by weight added at the starting feed blending stage—was varied between 0.3 and 1.6 (as analyzed) in terms of the molar ratio of Ca to Si, and was estimated in terms of sintered density. The results are shown in FIG. 11.

While there is no extreme difference in sintered density within such a range as mentioned above, it is found that more favorable results are obtained within the range of 0.4 to 1.4, particularly 0.5 to 1.2. From estimation made using $SrCO_3$ in place of $CaCO_3$, it is found that similar results are obtained, although depending on the molar ratio of Sr/Si, as analyzed.

EFFECT

According to the present invention, the degrees of orientation of compacts are much considerably improved and very high magnet properties are obtained, as already mentioned. It is noted that with a water slurry, such effect is not achievable at all, even when any surface active agent is used for wet compaction in a magnetic field.

What is claimed is:

1. An anisotropic ferrite magnet having a mean crystal grain diameter of at most 1.0 μm with a coefficient of variation of at most 80%, and a degree of orientation of at least 96% as expressed in terms of the ratio of saturated magnetization and residual magnetization.

2. The anisotropic ferrite magnet of claim 1, wherein said magnet is a sintered magnet and has an iHc of 4.0 to 4.470 kOe.

3. The anisotropic ferrite magnet of claim 1, wherein said magnet comprises 0.2 to 1.5 % by weight of Si, calculated as $SiO_2$.

4. The anisotropic ferrite magnet of claim 1, produced by a process comprising compacting a slurry containing the particulate raw materials for said ferrite magnet and a non-aqueous solvent in a magnetic field while removing said non-aqueous solvent therefrom to obtain a compact, and sintering said compact, wherein:

a surface active agent is allowed to exist in said slurry, thereby improving the degree of orientation of said compact.

5. The anisotropic ferrite magnet as recited in claim 4, wherein the step of preparing said slurry involves the wet pulverization of a slurry containing the starting powders of said particulate raw materials and said non-aqueous solvent.

6. The anisotropic ferrite magnet as recited in claim 4, wherein the step of preparing said slurry involves the wet pulverization of the starting powders of said particulate raw materials, followed by the substitution of the solvent used there by said non-aqueous solvent.

7. The anisotropic ferrite magnet as claimed in claim 4, wherein the step of preparing said slurry involves the dry or wet pulverization of the starting powders of said particulate raw materials, followed by the addition of said surface active agent, or said active agent and said non-aqueous solvent.

8. The anisotropic ferrite magnet as recited in claim 4, wherein said surface active agent is added to the starting powders of said particulate raw materials prior to dry or wet pulverization.

9. The anisotropic ferrite magnet as recited in claim 4, wherein said particulate raw materials or the starting powders thereof are prepared by calcination, and dry pulverization.

10. The anisotropic ferrite magnet as recited in claim 4, wherein crystal strains are introduced in said particulate raw materials, with the iHc value reduced to 3.5 kOe or less.

11. The anisotropic ferrite magnet as recited in claim 4, wherein crystal strains are introduced into said particulate raw materials, and anisotropy constants $K_1$ and $K_2$ in an external magnetic field of 20 kOe, determined by the torque curves thereof, conform to $$K_2/(K_1+K_2) \geq 0.2.$$

12. The anisotropic ferrite magnet as recited in claim 4, wherein said surface active agent contains a metal element added to ferrite.

13. The anisotropic ferrite magnet as claimed in claim 4, wherein said particulate raw materials are obtained by mixing together the starting materials for obtaining said particulate raw materials or the starting powders therefor, calcining the mixture and pulverizing the thus calcined powders, and in the mixing of said starting materials, $SiO_2$ is added to said starting materials in an amount of 10 to 90% by weight of the total amount to be added, and in said pulverization of said calcined powders, the rest of $SiO_2$ is added to said calcined powders, thereby obtaining an anisotropic ferrite containing 0.2 to 1.5% by weight of $SiO_2$.

* * * * *